(12) United States Patent
Koike et al.

(10) Patent No.: US 7,003,368 B2
(45) Date of Patent: Feb. 21, 2006

(54) MANUFACTURING METHOD FOR A PLURALITY OF MANUFACTURING LOTS

(75) Inventors: Manabu Koike, Toyoake (JP); Masaaki Kuroyanagi, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/809,153

(22) Filed: Mar. 25, 2004

(65) Prior Publication Data

US 2004/0210340 A1 Oct. 21, 2004

(30) Foreign Application Priority Data

Mar. 25, 2003 (JP) .............................. 2003-083437

(51) Int. Cl.
*G06F 19/00* (2006.01)
(52) U.S. Cl. .......................... 700/121; 700/19; 700/23; 700/96; 700/97; 700/99; 700/103; 700/114; 116/213
(58) Field of Classification Search ................. 700/19, 700/23, 27, 56, 60, 95–97, 99, 103, 106, 700/112–116, 121, 213, 226, 228, 229
See application file for complete search history.

(56) References Cited

U.S. PATENT DOCUMENTS

| | | | |
|---|---|---|---|
| 3,730,595 A | * | 5/1973 | Yakubowski .................. 406/72 |
| 4,027,246 A | * | 5/1977 | Caccoma et al. ............. 700/121 |
| 5,856,923 A | * | 1/1999 | Jones et al. .................. 700/121 |
| 5,980,591 A | * | 11/1999 | Akimoto et al. ............. 29/25.01 |
| 6,449,522 B1 | * | 9/2002 | Conboy et al. .............. 700/121 |

FOREIGN PATENT DOCUMENTS

| | | |
|---|---|---|
| JP | 5-20332 | 1/1993 |
| JP | 5-109596 | 4/1993 |
| JP | 5-147723 | 6/1993 |
| JP | 7-240357 | 9/1995 |
| JP | 8-46006 | 2/1996 |
| JP | 8/78301 | 3/1996 |
| JP | 8-85050 | 4/1996 |

* cited by examiner

*Primary Examiner*—Leo Picard
*Assistant Examiner*—Sean Shechtman
(74) *Attorney, Agent, or Firm*—Harness, Dickey & Pierce, PLC

(57) ABSTRACT

As a basic managing pattern, each manufacturing lot containing at least one workpiece is designated as a main objective to be managed. An appropriate number of similar type manufacturing lots containing workpieces having the same work conditions in at least one work step are loaded on a carrier. Then, the carrier is transported to a batch apparatus that performs simultaneous processing or machining operation applied to the workpieces or to an apparatus that brings the workpieces into an in-process work step under the same conditions, so as to cause the workpieces contained in respective similar type manufacturing lots to pass along a plurality of manufacturing process flows. Alternatively, an appropriate number of different type manufacturing lots containing workpieces having different work conditions are loaded on a carrier. Then, the carrier is transported to an apparatus that is capable of simultaneously bringing the workpieces into in-process work steps of different conditions, so as to cause the workpieces contained in respective different type manufacturing lots to pass along a plurality of manufacturing process flows.

29 Claims, 12 Drawing Sheets

FIG. 3
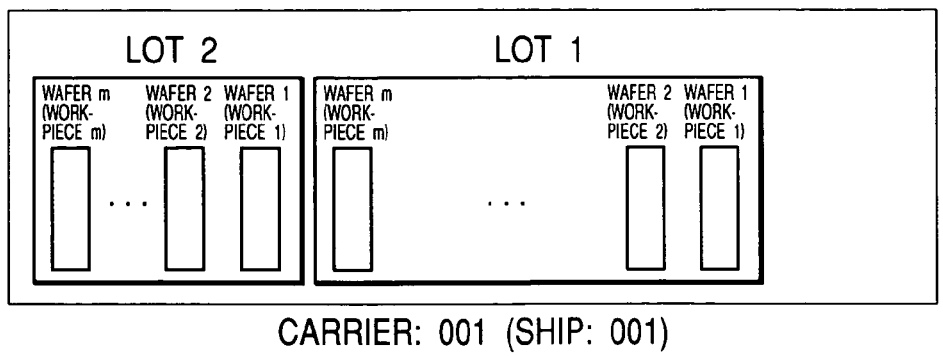
CARRIER: 001 (SHIP: 001)
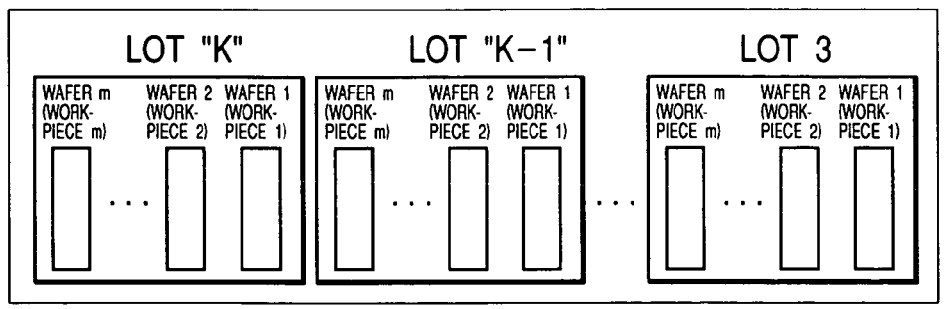
CARRIER: 002 (SHIP: 002)
FIG. 4
PRIOR ART
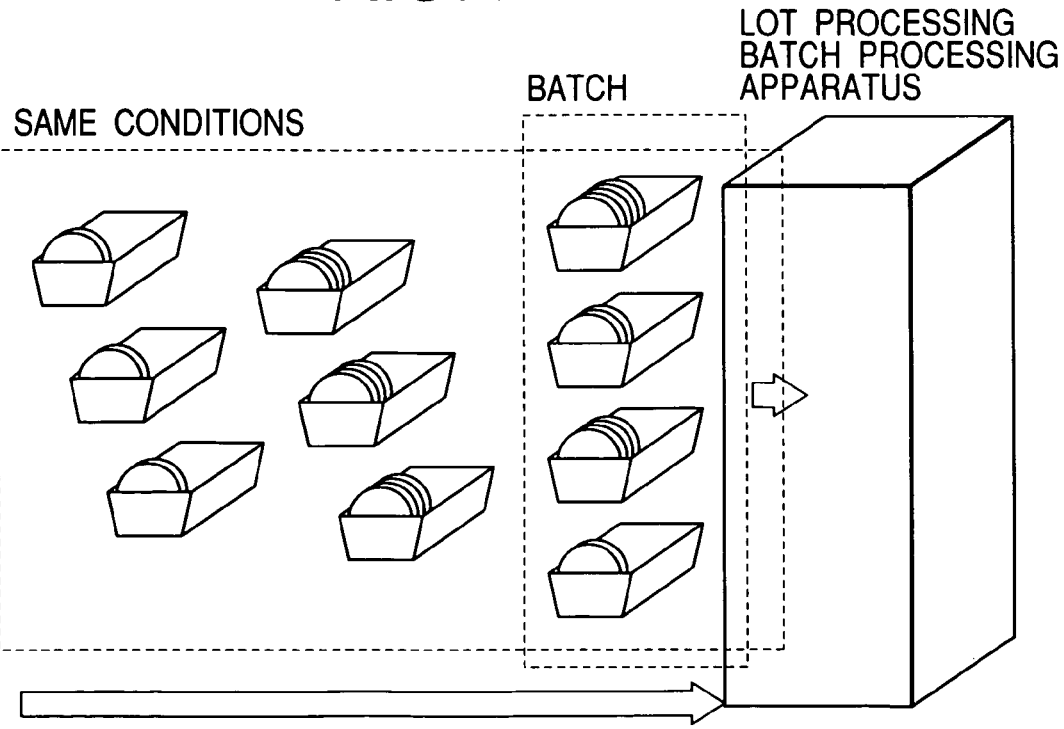

FIG. 15

NEW SYSTEM

| CARRIER | LOT |
|---|---|
| S0123 | MZ12301-0156 |
| S0123 | MZ12301-0154 |
| S0123 | MZ12303-0159 |
| S0123 | MZ12309-0140 |

OLD SYSTEM

| CARRIER | LOT |
|---|---|
| S0123 | MZ12301-0156 |
| #0001 | MZ12301-0154 |
| #0002 | MZ12303-0159 |
| #0003 | MZ12309-0140 |

VIRTUAL CARRIERS USABLE IN SYSTEM

FIG. 16

| | | CONVENTIONAL | | MIX-LOADING ONLY IN SAME WORK STEP CONDITIONS | | | MIX-LOADING IN BOTH SAME AND DIFFERENT WORK STEP CONDITIONS | | |
|---|---|---|---|---|---|---|---|---|---|
| | PRODUCTION WORKPIECE RATE | LOADED WORKPIECE NUMBER/ CARRIER | WORKPIECE LOADING RATE | PRODUCTION WORKPIECE RATE | LOADED WORKPIECE NUMBER/ CARRIER | WORKPIECE LOADING RATE | PRODUCTION WORKPIECE RATE | LOADED WORKPIECE NUMBER/ CARRIER | WORKPIECE LOADING RATE |
| PROCESS FLOW GROUP 1 | 2.5% | 25.0 | 100.0% | 2.5% | 25.0 | 100.0% | 2.5% | 25.0 | 100.0% |
| PROCESS FLOW GROUP 2 1ST HALF | 6.3% | 23.2 | 92.9% | 6.3% | 23.2 | 92.9% | 6.3% | 23.2 | 92.9% |
| PROCESS FLOW GROUP 2 2ND HALF | 6.2% | 2.8 | 11.4% | 6.2% | 21.4 | 85.7% | 6.2% | 23.4 | 93.7% |
| PROCESS FLOW GROUP 3 1ST HALF | 14.3% | 20.9 | 83.6% | 14.3% | 20.9 | 83.6% | 14.3% | 20.9 | 83.6% |
| PROCESS FLOW GROUP 3 2ND HALF | 13.1% | 2.8 | 11.2% | 13.1% | 23.3 | 93.1% | 13.1% | 24.1 | 96.4% |
| PROCESS FLOW GROUP 4 1ST HALF | 18.6% | 19.9 | 79.6% | 18.6% | 19.9 | 79.6% | 18.6% | 19.9 | 79.6% |
| PROCESS FLOW GROUP 4 2ND HALF | 13.0% | 3.6 | 14.4% | 13.0% | 22.6 | 90.6% | 13.0% | 24.3 | 97.3% |
| PROCESS FLOW GROUP 5 1ST HALF | 2.4% | 25.0 | 100.0% | 2.4% | 25.0 | 100.0% | 2.4% | 25.0 | 100.0% |
| PROCESS FLOW GROUP 5 2ND HALF | 5.3% | 12.2 | 48.6% | 5.3% | 22.8 | 91.1% | 5.3% | 23.8 | 95.1% |
| PROCESS FLOW GROUP 6 1ST HALF | 5.6% | 19.3 | 77.3% | 5.6% | 19.3 | 77.3% | 5.6% | 19.3 | 77.3% |
| PROCESS FLOW GROUP 6 2ND HALF | 2.2% | 2.6 | 10.5% | 2.2% | 20.0 | 79.8% | 2.2% | 22.0 | 87.8% |
| PROCESS FLOW GROUP 7 | 3.5% | 24.5 | 98.1% | 3.5% | 24.5 | 98.1% | 3.5% | 24.5 | 98.1% |
| PROCESS FLOW GROUP 8 | 7.1% | 25.0 | 100.0% | 7.1% | 25.0 | 100.0% | 7.1% | 25.0 | 100.0% |
| ENTIRETY | 100.0% | 6.9 | 27.5% | 100.0% | 21.9 | 87.6% | 100.0% | 22.4 | 89.6% |

MANUFACTURING METHOD FOR A PLURALITY OF MANUFACTURING LOTS

BACKGROUND OF THE INVENTION

The present invention relates to a manufacturing managing method.

Conventionally, in a case that semiconductor wafers or other devices are manufactured regularly or by way of experimental trial, a wafer loading carrier (or a cassette, or a casing, which are collectively referred to as a carrier) conveys a plurality of (e.g. 25) wafers serving as workpieces. In the following description, respective wafers are explained as a representative example of the workpiece. For example, as shown in FIG. 18, the group of wafers belonging to the same manufacturing lot, i.e. passing the same manufacturing process flow, is loaded on the same carrier. Such a managing method and a related control or assist system are conventionally employed in the manufacturing facility of the semiconductor wafers.

Hereinafter, the manufacturing process flow will be explained. In general, the manufacturing processes include work steps or stages that beforehand determine or specify various conditions with respect to processing or machining, measurement, inspection, etc. In this case, various conditions include exposure reticles or exposure masks used in the photolithographic process as well as patterning programs for the laser beam irradiation.

Furthermore, each manufacturing lot constitutes a group of wafers that are identical with each other in a manufacturing start line or other base point. In other words, the manufacturing lot is a group of wafers that are basically the same in the manufacturing process flow. An advantage of using this manufacturing method is easiness in management because the carrier and the manufacturing lot are basically in a one-to-one relationship or in an n-to-1 relationship.

However, according to this method, especially in a factory having a multi-kind and small quantity type product configuration, manufacturing the required products at required timing necessarily decreases the wafer loading number (or rate) of each carrier. The in-process efficiency in each manufacturing, processing or machining (or, measuring or inspecting) apparatus decreases accordingly. Furthermore, this prevents the effective use of the carrier and accordingly worsens the space saving and undesirably increases the frequency in conveyance (transportation).

Increasing the wafer loading number (or rate) of the carrier to improve the in-process efficiency will result in increase of the front-loading manufacturing work to an extent exceeding a required amount. Furthermore, a great number of unnecessary wafers will remain in respective processes of the entire manufacturing flow. This leads to increase in inventory or generation of hoarded products. As a result, this disturbs an earlier delivery of manufactured products.

Furthermore, even in a factory having a large quantity type product configuration, loading a plurality of (e.g. 25) wafers on a carrier will be subjected to predestinated check or various measurements and inspections on processed or machined semi-finished products in the way of manufacturing processes to remove defective products. In such a case, defining the relationship between the carrier and the manufacturing lot to be basically one-to-one or n-to-1 will decrease the wafer loading number (or rate) of the carrier.

Similarly, in the way of manufacturing processes, separating the carriers according to the quality level (i.e. rank) to realize classification of the wafers according to the quality level (i.e. rank) will decrease the wafer loading number (or rate). Alternatively, successively loading the wafers sorted according to the quality level (rank) on a carrier without changing the manufacturing lot will make the relationship between the carrier and the manufacturing lot vague and accordingly will make it difficult to manage the relationship between the carrier and the manufacturing lot.

To solve the above problems, for example, the Japanese Patent Application Laid-open No. 5-109596 discloses a manufacturing and controlling method including a lot division step of dividing the lot into some groups each consisting of wafers having the same processing conditions, a step of displaying manufacturing processing conditions of respective divided lot groups, and a step of reuniting the divided lot groups after finishing the processes differentiated in manufacturing processing conditions. Using such a method is not preferable in that the lot number does not agree with the manufacturing process flow (i.e. historical data).

Furthermore, it may be possible to add facilities to enhance the manufacturing capability or capacity for each manufacturing, processing or machining (or, measuring or inspecting) apparatus. However, this method apparently retrogrades with respect to efficient use (or operation) of respective apparatuses as well as efficient investment (or supply).

From the above-described background, especially in a factory having a multi-kind and small quantity type product configuration, the wafer-based management system has been generally considered as being prospective especially for the manufacturing method and its control and a related managing system. In this case, each manufacturing lot is managed based on the wafer (i.e. wafer sheet-feed based management). For example, ID assigned wafers are grouped into the same lot. The wafer loading carrier is used to load a plurality of (e.g. 25) wafers. The management is complicated and the system is complicated too. Thus, this is practically not used as an effect manufacturing method and its control managing or assisting system.

Furthermore, improving an existing system using one-to-one relationship in managing the carrier and the manufacturing lot will generally require a large-scale replacement of the system. Depending on stepwise efficient investment (supply) while utilizing the existing properties (including continuous manufacturing activities in the existing factories) could not be practically realized.

Although the above-described explanation is based on an example of the factory having the multi-kind and small quantity type product configuration, the explanation will be equally applied to a case where the number of wafers on each carrier is smaller because of recent increase in the aperture size of wafers (e.g. 300 mm) and accordingly because of substantial increase in the chip number manufactured from one piece of wafer.

SUMMARY OF THE INVENTION

In view of the foregoing problems of the prior art, the present invention has a first object to provide a manufacturing managing method capable of easily managing the manufacturing processes even when the number of workpieces loaded on one lot is small. Furthermore, the present invention has a second object to provide a manufacturing managing method capable of assuring high in-process efficiency of respective apparatuses and also capable of shortening the lead time.

In order to accomplish the above and other related objects, the present invention provides a first manufacturing managing method including, as a basic managing pattern, a step of designating each manufacturing lot containing at least one workpiece as a main objective to be managed, and a step of loading an appropriate number of manufacturing lots on a carrier so as to cause the workpieces contained in respective manufacturing lots to pass along a plurality of manufacturing process flows.

Furthermore, the present invention provides a second manufacturing managing method including, as a basic managing pattern, a step of designating each manufacturing lot containing at least one workpiece as a main objective to be managed, a step of loading an appropriate number of similar type manufacturing lots on a carrier, under a condition that the similar type manufacturing lots contain workpieces having the same work conditions in at least one work step, and a step of transporting the carrier to a batch apparatus that performs simultaneous processing or machining operation applied to the workpieces or to an apparatus that brings the workpieces into an in-process work step under the same conditions, so as to cause the workpieces contained in respective similar type manufacturing lots to pass along a plurality of manufacturing process flows.

Moreover, the present invention provides a third manufacturing managing method including, as a basic managing pattern, a step of designating each manufacturing lot containing at least one workpiece as a main objective to be managed, a step of loading an appropriate number of different type manufacturing lots on a carrier, under a condition that the different type manufacturing lots contain workpieces having different work conditions, and a step of transporting the carrier to an apparatus that is capable of simultaneously bringing the workpieces into in-process work steps of different conditions, so as to cause the workpieces contained in respective different type manufacturing lots to pass along a plurality of manufacturing process flows.

The first to third manufacturing managing methods of the present invention enable to maintain easiness in managing the workpieces without complicating the system. Namely, a small quantity of required products can be manufactured at required timing by reducing the workpiece loading number (or rate) in each lot, not the workpiece loading rate in the carrier. Executing the lot mix-loading of this embodiment enables to maintain or increase the workpiece loading rate in the carrier. In this manner, easy management of the workpieces is feasible even in a case that the workpiece number per lot is small.

Using the second or third manufacturing managing methods of the present invention enables each carrier to have a higher wafer loading number (or rate) and further enables each manufacturing (or, measuring or inspecting) apparatus to have excellent in-process efficiency. Accordingly, it is not necessary to increase the front-loading manufacturing (or, measuring or inspecting) work to an extent exceeding a required amount. The inventory can be reduced when considered in the entire manufacturing process. Furthermore, the generation of hoarded products can be reduced. Further shortening the lead time, i.e. earlier delivery of manufactured products, can be realized. In this manner, this embodiment assures high in-process efficiency of respective apparatuses and shortens the lead time.

According to a preferred embodiment of the present invention, the manufacturing managing method further includes a step of making a judgment before starting the in-process work step in the apparatus as to whether or not the workpieces contained in the plurality of lots should be loaded on the carrier. Especially, it is preferable that the manufacturing managing method includes a step of further loading additional workpieces of at least one lot on the carrier under a condition that the workpieces contained in the plurality of lots are already loaded on the carrier before the carrier is transported to an apparatus that has the capability of processing an increased number of workpieces.

According to the preferred embodiment of the present invention, the manufacturing managing method further includes a step of making a judgment after finishing the in-process work step in the apparatus as to whether or not the workpieces of a predetermined number of lots should be unloaded from the carrier under a condition that the workpieces contained in the plurality of lots are loaded on the carrier. Especially, it is preferable that the manufacturing managing method includes a step of unloading the workpieces of a specific lot beforehand when this specific lot cannot be processed together with other lots in the next manufacturing process flow.

According to the preferred embodiment of the present invention, the manufacturing managing method further includes a step of unloading the workpieces of at least one specific lot under a condition that the workpieces contained in the plurality of lots are already loaded on this carrier and a step of loading required workpieces of another lots on this carrier, thereby repacking the workpieces on the carrier before starting the in-process work step in the apparatus.

According to the preferred embodiment of the present invention, the manufacturing managing method further includes a step of unloading part of workpieces in the same lot before starting the in-process work step in the apparatus in such a manner that an original lot number of each unloaded workpiece can be identified later from a condition that the workpieces contained in the plurality of lots are loaded on the carrier, and a step of loading another workpieces of at least one new lot on this carrier.

According to the preferred embodiment of the present invention, the manufacturing managing method further includes a step of temporarily stopping or decelerating the carrier at a mix-loading waiting point provided adjacent to the apparatus and a step of make a judgment as to whether or not the workpiece contained in the plurality of lots are loadable on the carrier.

According to the manufacturing managing method of the present invention, it is preferable that the apparatus restricts the loading of workpieces contained in a plurality of lots onto the carrier. It is also preferable that the loading of workpieces contained in a plurality of lots onto the carrier is restricted based on at least either one of a product name (i.e. the type name inherently given according to the manufacturing process flow type) and a fundamental process flow (i.e. the name given to similar types or used for regarding a group of manufacturing process flows containing partly different work steps as the similar type). It is also preferable that the loading of workpieces contained in a plurality of lots onto the carrier is restricted based on a carrier type.

According to the manufacturing managing method of the present invention, it is preferable that the workpieces contained in the plurality of lots and once loaded on the carrier are managed as a lot group not being easily separable. Furthermore, it is preferable that a loading of workpieces onto the carrier by using a new lot is prohibited.

According to the manufacturing managing method of the present invention, it is preferable that a specific lot is continuously loaded on the same carrier when unloading of the specific lot is prohibited beforehand. Furthermore, it is preferable that a loading of workpieces contained in other lots is prohibited when a specific lot to be processed urgently is loaded on the carrier.

Moreover, in a case that an old system using a one-to-one relationship for managing the carrier and the manufacturing lot coexists with a new system using a 1-to-n (n is an integer not smaller than 1) relationship for managing the carrier and the manufacturing lot, it is preferable that the manufacturing managing method includes a step of assigning an original carrier number and an original lot number to one carrier and its lot in the old system and also assigning a pseudo carrier number and a pseudo lot number to other carrier and its lot, thereby realizing a dummy one-to-one management applied to the carrier and the manufacturing lot.

BRIEF DESCRIPTION OF THE DRAWINGS

The above and other objects, features and advantages of the present invention will become more apparent from the following detailed description which is to be read in conjunction with the accompanying drawings, in which:

FIG. 3 is a diagram showing the wafer loading condition of respective carriers in accordance with a preferred embodiment of the present invention;

FIG. 4 is a diagram showing the wafer loading condition of the carrier when the batch processing is executed according to a conventional manufacturing method;

FIG. 15 is a diagram explaining a managing method employed in a case that an old system and a new system coexist in accordance with the preferred embodiment of the present invention;

FIG. 16 is a table showing the result of a simulation performed to confirm the effects of the manufacturing method in accordance with the preferred embodiment of the present invention;

DESCRIPTION OF THE PREFERRED EMBODIMENTS

Figure 1:
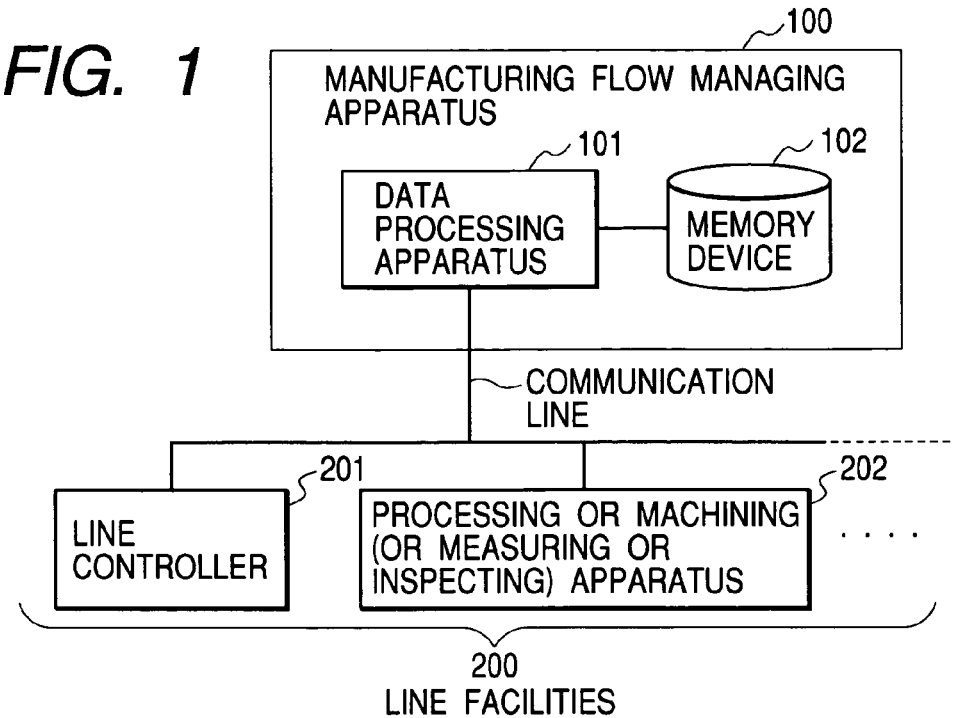
FIG. 1 is a diagram showing a schematic arrangement of a manufacturing managing system in accordance with a preferred embodiment of the present invention.

Hereinafter, preferred embodiments of the present invention will be explained with reference to the attached drawings. FIG. 1 is a schematic diagram showing an operational managing (or manufacturing managing) system applied to a wafer factory that regularly or experimentally manufactures semiconductor wafers to be handled as workpieces in manufacturing processes.

In the semiconductor wafer factory, a line controller 201 is placed by the manufacturing line and a manufacturing, processing or machining (or, measuring or inspecting) apparatus 202 is also equipped by the line. Furthermore, a manufacturing flow managing apparatus (i.e. server machine) 100 is placed at a predetermined position relatively far from the line facilities 200. The manufacturing flow managing apparatus 100 includes a data processing apparatus (microcomputer etc.) 101 and a memory device 102. A communication line (or a communication apparatus) is provided to allow mutual communication between the line devices 201 and 202 and the data processing apparatus (microcomputer etc.) 101 of the manufacturing flow managing apparatus 100. The line controller 201 is an apparatus used for instructing or prohibiting execution of in-process work steps for the workpieces. For example, the line controller 201 gives instructions directly or indirectly to workers, or to robots, or to the manufacturing, processing or machining (or, measuring or inspecting) apparatus 202.

Figure 2:
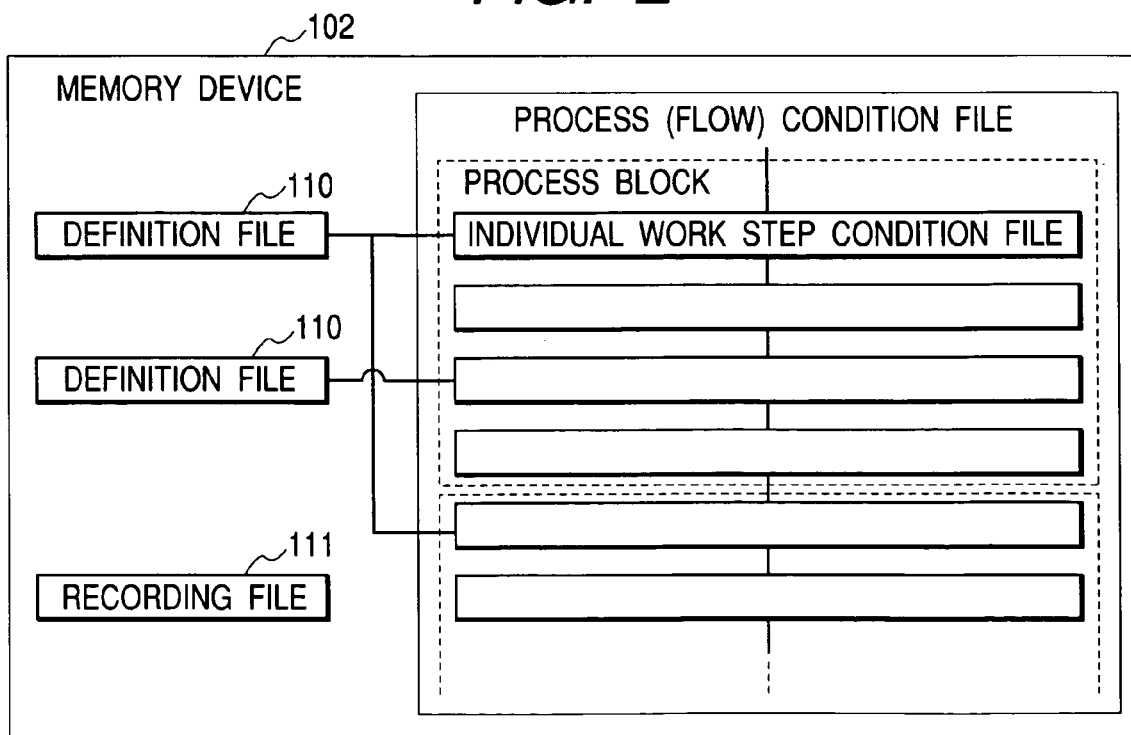
FIG. 2 is a diagram showing memory contents in a memory device in accordance with a preferred embodiment of the present invention.

The memory device 102 of the manufacturing flow managing apparatus 100 shown in FIG. 1 has the memory contents shown in FIG. 2. The memory device 102 has definition (or condition judgment) files 110 and a manufacturing flow (or processes) recording file 111.

In this system, an aspect of only one lot being loaded on a carrier is regarded as one of various types of lot mix-loading patterns and is referred to as single lot mix-loading. Furthermore, a carrier used for the mix-loading of one or more lots is referred to as ship (SHIP).

Hereinafter, the explanation is given for a basic system capable of executing highly automated mix-loading/unloading (transferring) operations, not for a manual type that is occasionally activated according to arbitrary human instructions entered through a system terminal or the like and as a result realizing the mix-loading/unloading (transferring) operations occasionally (for example, mix-loaded lots (wafers) or unloaded lots are respectively designated by using a transfer screen or the like). However, the fundamentals of the manufacturing management are common to both of automated and manual types.

First, as shown in FIG. 3, the basic managing pattern is based on a managing method for regarding each manufacturing lot as a main objective to be managed when this manufacturing lot includes an assembly of desirably a plurality of wafers (but including the case of only one wafer). This managing method includes a step of loading a plurality of manufacturing lots on a carrier (referred to as lot mix-loading). Namely, in the manufacturing managing method for semiconductor devices, the basic managing pattern regards each manufacturing lot including at least one wafer as a main objective to be managed, and appropriately loads the wafers of a plurality of lots on a carrier to cause them to pass a plurality of manufacturing process flows.

This enables to maintain easiness in managing the wafers without complicating the system. Namely, this embodiment manages the wafer loading number (or rate) in each lot to be small, not the wafer loading number (or rate) in each carrier, so that a small quantity of required products can be manufactured at the required timing. In this case, the wafers of each lot are loaded according to the lot mix-loading. This enables to maintain or increase the wafer loading number (or rate) in each carrier. As a result, adopting the lot mix-loading brings the effect of preventing the wafer loading number (or rate) in the carrier from decreasing. As described above, even in a case that the wafer number per lot is small, managing the wafers is easily feasible.

Figure 5:
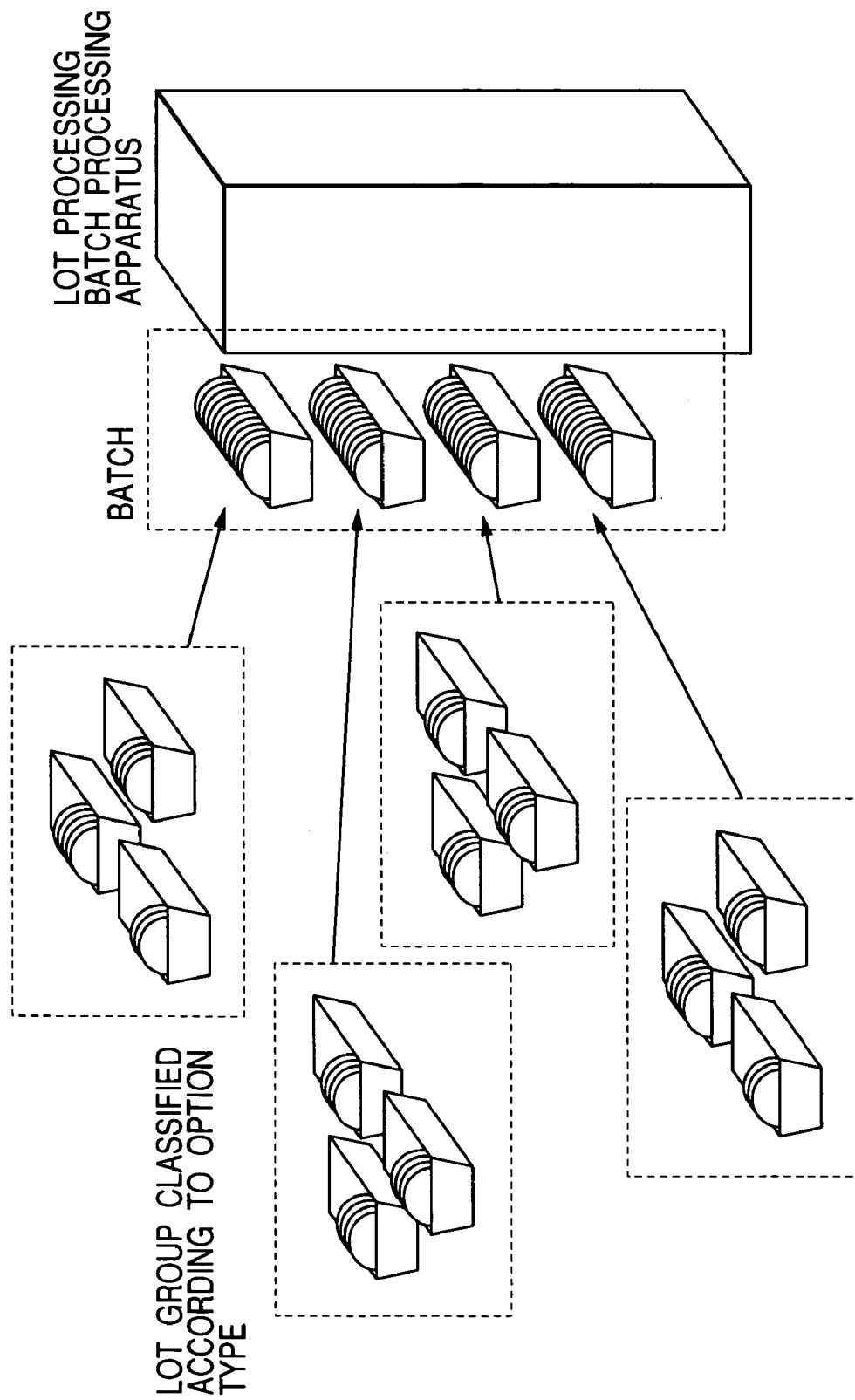
FIG. 5 is a diagram showing the wafer loading condition of the carrier when the batch processing is executed in accordance with a preferred embodiment of the present invention.

Furthermore, as shown in FIG. 4, only the lots having the same work step conditions were conventionally brought into a lot processing (e.g., batch processing) apparatus, such as a furnace, and accordingly the number of workpieces contained in each lot was relatively small. On the other hand, this embodiment adopts the method illustrated in FIG. 5. A batch apparatus shown in FIG. 5 is used in each manufacturing (or, measuring or inspecting) processes. This apparatus has the capability of simultaneously processing or machining a plurality of wafers or comparable workpieces. A carrier conveys similar type lots (i.e., lots having the same work conditions in at least one work step) to the batch apparatus. In this case, the carrier can load a plurality of similar type lots simultaneously when appropriate according to the later described method, and unloads some lots after finishing the in-process work step if necessary. Thus, this embodiment can improve the loading rate and accordingly improve the in-process efficiency.

Figure 6:
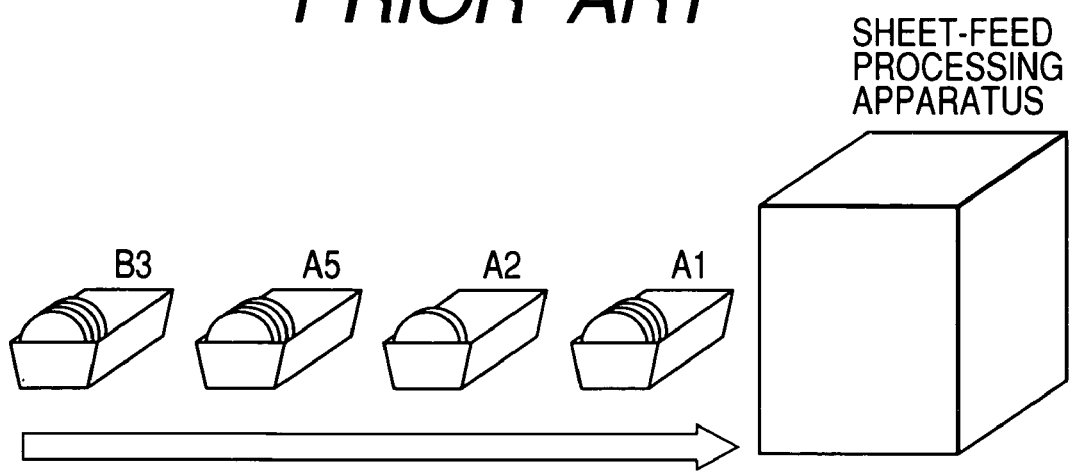
FIG. 6 is a diagram showing the wafer loading condition of the carrier when the sheet-feed processing is executed according to a conventional manufacturing method.
Figure 7:
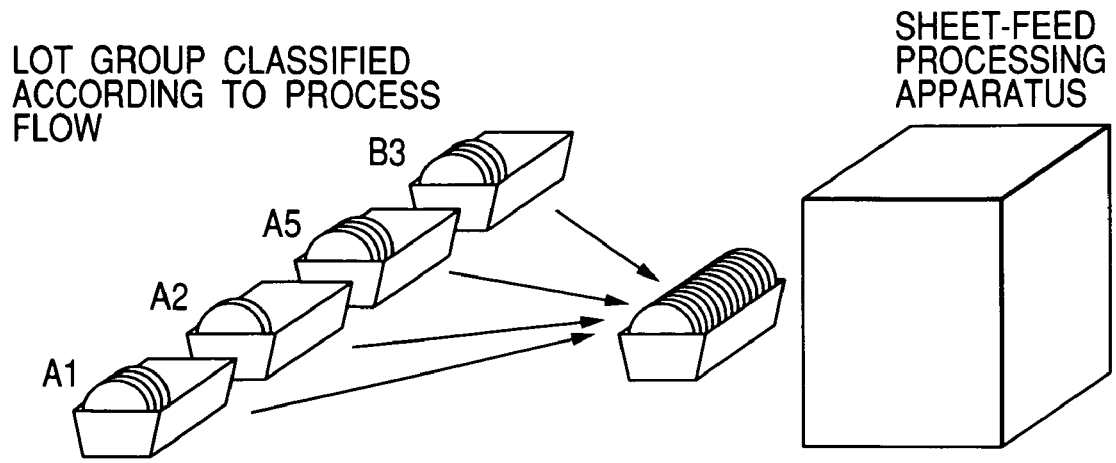
FIG. 7 is a diagram showing the wafer loading condition of the carrier when the sheet-feed processing is executed in accordance with a preferred embodiment of the present invention.

This is referred to as "mix-loading based on the same work step conditions", that is characterized by the method for simultaneously loading a plurality of workpieces having the same manufacturing process (or, measuring or inspecting) conditions. Furthermore, as shown in FIG. 6, the lots having different type work step conditions were conventionally brought into a sheet-feed processing apparatus, such as a stepper. In this case, the respective lots are separately brought into an in-process work step even when the processes are mutually similar. On the other hand, this embodiment adopts the method illustrated in FIG. 7. A wafer-based processing apparatus shown in FIG. 7 is used in each manufacturing (or, measuring or inspecting) apparatus. This apparatus has the capability of simultaneously a plurality of wafers or comparable workpieces. This apparatus can simultaneously bring the wafers or comparable workpieces having different conditions into the in-process work step. A carrier conveys the different type lots (i.e. lots having different work conditions) to this sheet-feed processing. In this case, the carrier can load a plurality of different type lots simultaneously when appropriate according to the later described method, and unloads some lots after finishing the in-process work step if necessary. Thus, this embodiment can improve the loading rate and accordingly improve the in-process or transportation efficiency. Furthermore, this embodiment can transport the workpieces to the next process or work step at a high loading rate.

This is referred to as "mix-loading based on different type work step conditions" that is characterized by the method for simultaneously loading a plurality of lots having different manufacturing process (or, measuring or inspecting) conditions. This method is applicable to a sheet-feed recipe machine apparatus, and according can be referred to, in a narrow meaning, as a sheet-feed recipe machine mix-loading. In this case, the recipe represents work step conditions of the apparatus.

In this manner, the manufacturing managing method explained with reference to FIG. 5 includes, as a basic managing pattern, a step of designating each manufacturing lot including at least one wafer as a main objective to be managed, a step of arranging a plurality of similar type lots containing the wafers having the same work conditions in at least one work step, a step of loading an appropriate number of similar type lots on a carrier, and a step of transporting the carrier to a batch apparatus that performs simultaneous processing or machining operation applied to the wafers (or to an apparatus that brings the wafers into an in-process work step under the same conditions), so as to cause the wafers contained in respective similar type lots to pass along a plurality of manufacturing process flows.

The manufacturing managing method explained with reference to FIG. 7 includes, as a basic managing pattern, a step of designating each manufacturing lot including at least one wafer as a main objective to be managed, a step of arranging a plurality of different type lots containing the wafers having different work conditions, a step of loading an appropriate number of different type lots on a carrier, and transporting the carrier to an apparatus that is capable of simultaneously bringing the wafers into in-process work steps of different conditions, so as to cause the wafers contained in respective different type lots to pass along a plurality of manufacturing process flows.

Using these methods enables each carrier to have a higher wafer loading number (or rate) and further enables each manufacturing (or, measuring or inspecting) apparatus to have excellent in-process efficiency. Accordingly, it is not necessary to increase the front-loading manufacturing (or, measuring or inspecting) work to an extent exceeding a required amount. The inventory can be reduced when considered in the entire manufacturing process. Furthermore, the generation of hoarded products can be reduced. Further shortening the lead time, i.e. earlier delivery of manufactured products, can be realized. In this manner, this embodiment assures high in-process efficiency of respective apparatuses and shortens the lead time.

Improving the in-process efficiency of each apparatus as much as possible will lead to suppression in the number of apparatuses required when an increased amount of production is scheduled, and accordingly will realize efficient investment (supply). It is needless to say that, in a case that a large quantity type of wafers are involved, the wafer loading number (or rate) in each carrier can be increased by increasing the wafer number in each lot as described above.

The above-described lot mix-loading and unloading operational is realized based on necessary judgments made by a manufacturing process controlling and managing system shown in FIGS. 1 and 2 and its assisting system, that includes the recording file 111 used for registering, renewing, and recording the manufacturing flow (or processes) beforehand or occasionally as well as the definition files 110 defining types and processing methods of the predetermined mix-loading patterns that are variably definable.

Namely, the process control managing system and the managing method assisting system make necessary judgment and execute necessary operations based on the manufacturing process flows (including manufacturing process flows of individual lots) that are registered, renewed, and recorded beforehand or occasionally, and also based on the manufacturing process and work historical data (e.g. the historical data indicating used apparatuses or executed reworking), and further based on the types and processing methods of the predetermined mix-loading patterns that are variably definable.

More specifically, the manufacturing managing method of this embodiment includes a step of making a judgment before starting the in-process work step in the apparatus as to whether or not the wafers contained in a plurality of lots should be loaded on the same carrier. Furthermore, the manufacturing managing method of this embodiment includes a step of making a judgment after finishing the in-process work step in the apparatus as to whether or not the wafers of a predetermined number of lots should be unloaded from the carrier under a condition that the wafers contained in the plurality of lots are loaded on the same carrier.

In this manner, this embodiment relates to a method for manufacturing electronic devices (mainly semiconductor devices) regularly or by way of experimental trial. For example, in a factory having a small quantity and multi-kind product configuration or in an experimental or trial facility, this embodiment permits to load a plurality of (e.g. 25) wafers to be manufactured on the same wafer loading carrier regardless of the manufacturing lot number or the manufacturing process flow (i.e. historical data). Namely, this embodiment is characteristic in mix-loading a plurality of different wafers on the same carrier. Compared with a conventional manufacturing method, this embodiment can solve various problems even when the factory has a multi-kind and small quantity product configuration or includes sampling or classification during the manufacturing processes, or in a case that the wafer number per lot becomes small due to increase in the aperture size of respective wafers (e.g. 300 mm). Furthermore, this embodiment can assure high in-process efficiency for each manufacturing (or, measuring or inspecting) apparatus, reduces the lead time for the respective manufacturing processes. Thus, this embodiment realizes earlier delivery of manufactured products. In addition to the above-described method, this embodiment provides a controlling and managing or assisting system as well as its constructive method and functional specifications.

Figure 8:
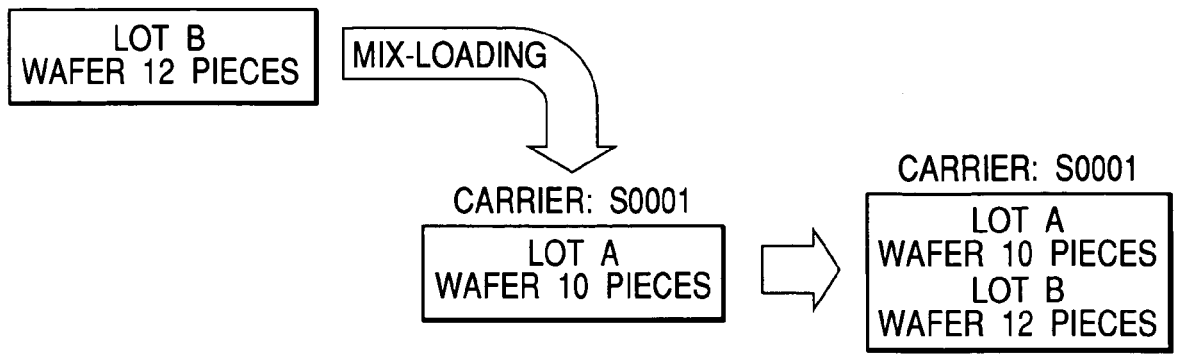
FIG. 8 is a diagram explaining the mix-loading of lots in accordance with a preferred embodiment of the present invention.

This embodiment provides various patterns for the lot mix-loading operation. FIG. 8 shows the simplest lot mix-loading pattern, according to which the lot A containing a total of 10 wafers is initially loaded on a carrier (having a carrier number: S0001). From this condition, the lot B containing a total of 12 wafers is mix-loaded on the same carrier.

Figure 9:
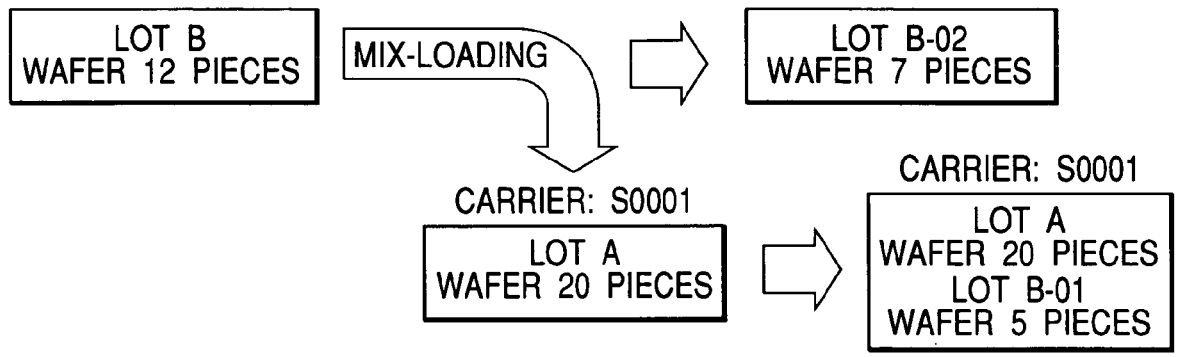
FIG. 9 is a diagram explaining the mix-loading of lots in accordance with a preferred embodiment of the present invention.

Furthermore, FIG. 9 shows a mix-loading accompanied with a lot unloading, according to which the lot A containing 20 wafers is initially loaded on the carrier S0001. From this condition, the lot B containing 12 wafers is once separated into a lot B-01 containing 5 wafers and a lot B-02 containing 7 wafers and then the lot B-01 containing 5 wafers is mix-loaded on the carrier S0001.

Figure 10:
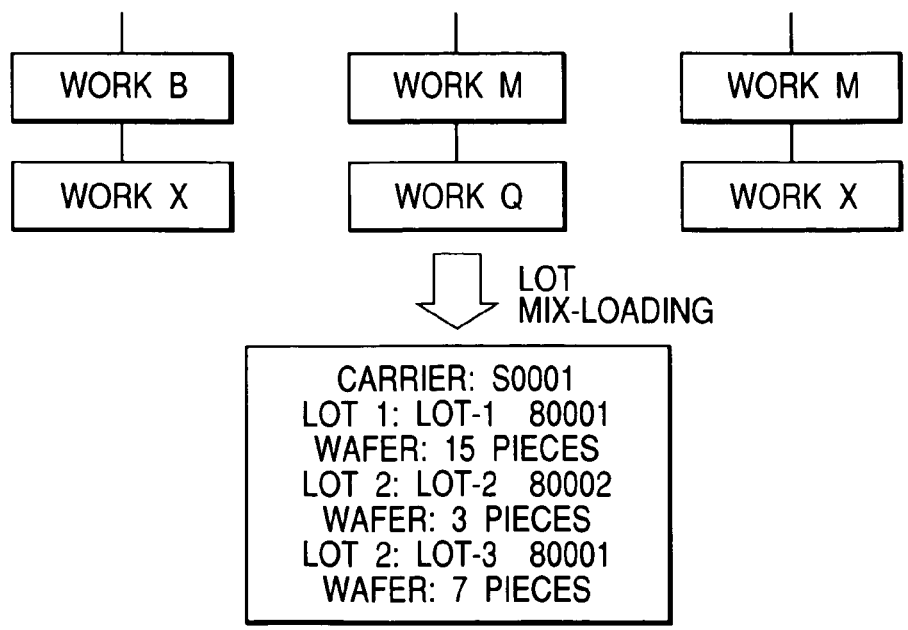
FIG. 10 is a diagram explaining the mix-loading of lots in accordance with a preferred embodiment of the present invention.

Furthermore, FIG. 10 shows a parallel lot mix-loading, according to which a lot-1 containing 15 wafers processed in the steps of work B and work X, a lot-2 containing 3 wafers processed in the steps of work M and work Q, and a lot-3 containing 7 wafers processed in the steps of work M and work X are mix-loaded on the same carrier S0001.

Figure 11:
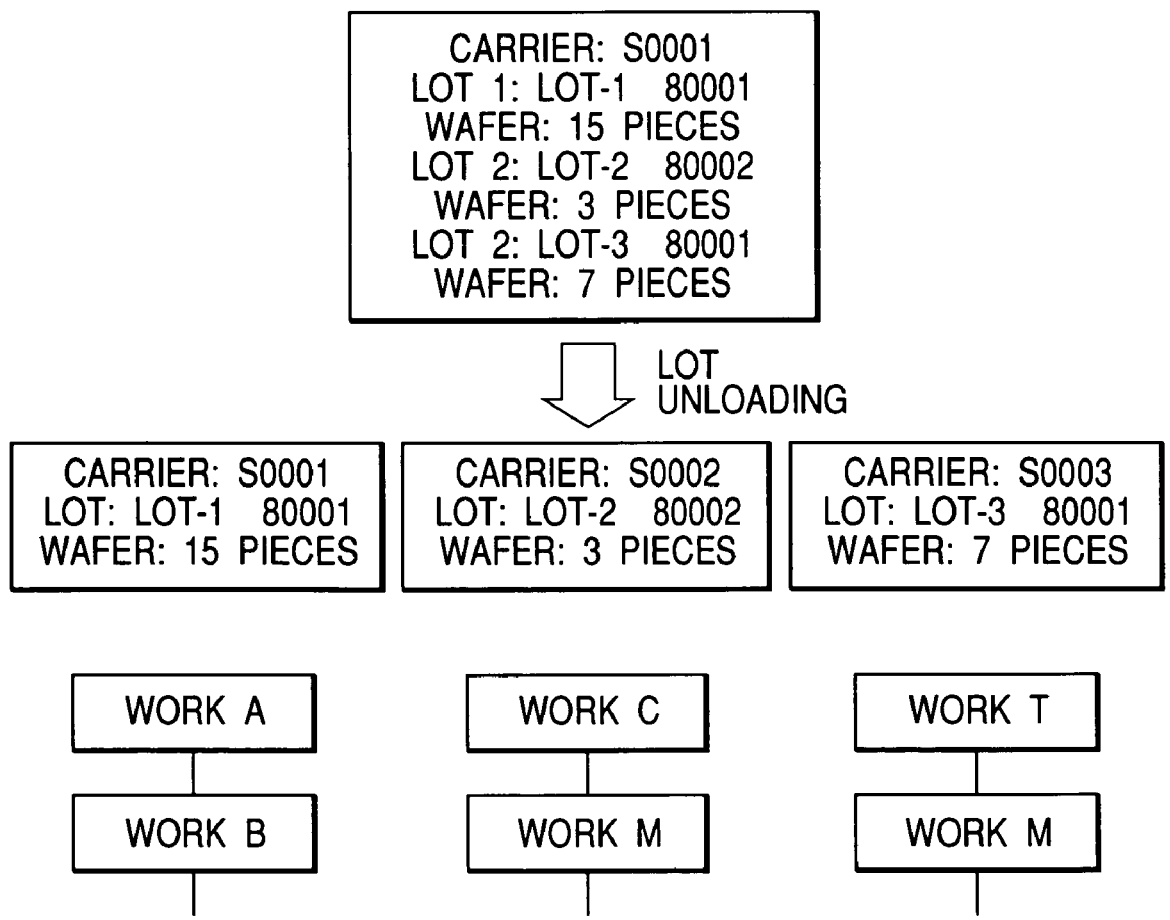
FIG. 11 is a diagram explaining the unloading of lots in accordance with a preferred embodiment of the present invention.

Furthermore FIG. 11 shows an example of the lot unloading operation which is carried out from the lot mix-loaded condition shown in FIG. 10. More specifically, the lot-1 containing 15 wafers remains on the same carrier S0001, while the lot-2 containing 3 wafers is once unloaded from this carrier S0001 and then reloaded on another carrier (having a carrier number:S0002). Similarly, the lot-3 containing 7 wafers is once unloaded from the original carrier S0001 and then reloaded on another carrier (having a carrier number: S0003). Subsequently, the lot-1 containing 15 wafers loaded on the carrier S0001 is subjected to the steps of work A and work B. The lot-2 containing 3 wafers loaded on the carrier S0002 is subjected to the steps of work C and work N. And, the lot-3 containing 7 wafers loaded on the carrier S0003 is subjected to the steps of work T and work M.

Next, with reference to FIG. 12, a mix-loading of wafers partly differentiated in using different reticle process flows (i.e. the mix-loading based on the same work step conditions) will be explained.

The optional intermediate inventory includes, as a lot organization, a plurality of lots identified by lot numbers M12301-0556, M12302-0589, M12305-0547 - - - . Each lot is loaded on each carrier. The wafers contained in these lots are subjected, as subsequent processes, to the photolithographic and other processes (such as fitting accuracy, line width measurement, and appearance inspection) according to the difference of the reticle to be used. Then, these lots are mix-loaded on the common carrier. Then, the lot mix-loaded wafers are brought into the same work step using the same reticle to perform ion implantation, resist removal, photolithography, fitting accuracy, line width measurement etc. Next, the wafers are separated into a plurality of groups according to the difference of circuit pattern (e.g. difference of the reticle). More specifically, respective wafers identified by the lot numbers M12301-0556, M12302-0589, M12305-0547 - - - are loaded on another carriers. The wafers contained in these lots are subjected to the photolithographic and other processes (such as fitting accuracy, measuring SEM, etching, resist peeling, measuring SEM, and appearance inspection) according to the difference of the reticle. Then, these lots (lot numbers M12301-0556, M12302-0589, M12305-0547 - - - ) are mix-loaded on the common carrier. The lot mix-loaded wafers are brought into the same work step using the same reticle to perform wiring etc.

Next, the wafers are separated into a plurality of groups according to the product name. More specifically, the wafers identified by the lot numbers M12301-0556, M12302-0589, M12305-0547 - - - are respectively loaded on another carriers and are then subjected to electric characteristics inspection.

Next, with reference to FIG. 13, a mix-loading of wafers processed in similar process flows using different reticles (i.e. the mix-loading based on the same work step conditions combined with the mix-loading based on different work step conditions) will be explained.

As a pattern of the lot mix-loading, wafers identified by the lot number M12301-0556, wafers identified by the lot number M12302-0589, and wafers identified by the lot number M12305-0547 are loaded together on a single carrier. Then, the lot mix-loaded wafers are conveyed into a sheet-feed recipe processing apparatus and are subjected to photolithographic and other processes (such as fitting accuracy, line width measurement, and appearance inspection) that are work steps differentiated in the reticle (i.e. different in the work step). Then, the lot mix-loaded wafers are subjected to ion implantation as the same work step. Then, the lot mix-loaded wafers are conveyed into a sheet-feed recipe processing apparatus and are subjected to etching, resist peeling or the like that are different work steps.

Next, with reference to FIG. 14, a mix-loading of wafers processed in manufacturing process flows having partly differentiated work steps (i.e. the mix-loading based on the same work step conditions combined with the mix-loading based on different type work step conditions) will be explained.

As a pattern of the lot mix-loading, wafers identified by the lot number M12301-0556, wafers identified by the lot number M12302-0589, wafers identified by the lot number M12305-0547, and wafers identified by the lot number M456-0346 are loaded together on a single carrier. Then, the lot mix-loaded wafers are separated according to the difference of flow. More specifically, the wafers of lot numbers M12301-0556, M12302-0589, and M12305-0547 are mix-loaded on the same carrier while the wafers of lot number M456-0346 are loaded on another carrier. Subsequently, the wafers of lot number M456-0346 and another wafers identified by lot number M756-0131 are mix-loaded on a single carrier. In this condition, the wafers are subjected to transistor optional work or the like. Next, the wafers are separated into a plurality of groups according to the product name. More specifically, the wafers identified by the lot numbers M12301-0556, M12302-0589, and M12305-0547 are respectively loaded on another carriers and are then subjected to electric characteristics inspection.

Although the separation of wafers according to the product name is performed prior to the electric characteristics inspection, such a separation will be unnecessary if the electric characteristics inspection apparatus has the capability of simultaneously processing the wafers having different product names.

Hereinafter, various functions of this system will be explained. First of all, "A: natural unloading" operation of this system will be explained. In the case of mix-loading a plurality of lots having partly different manufacturing process flows, it always happens that a specific lot cannot be simultaneously processed together with other lots in next work step or in a particular apparatus. The natural unloading is to unload such a specific lot beforehand when this specific lot cannot be simultaneously processed together with other lots. More specifically, the "A: natural unloading" operation is a function for unloading beforehand a specific lot that is cannot be simultaneously processed together with other lots in the next work step due to characteristics of the processing apparatus. Namely, according to the "A: natural unloading" operation, the wafers of a specific lot being unable to be simultaneously processed together with other lots in the next manufacturing process flow are unloaded beforehand.

Furthermore, the processing timing of this natural unloading is set to send-out timing of the lot (SHIP) from a current work step (apparatus). More specifically, the actual transfer operation for the lot (i.e. wafer) unloading from the carrier is carried out in the following manner. In the case of a factory having automated transportation facilities, this system sends necessary instruction to the transfer function equipped apparatus. In the case of an apparatus relying on manual transfer operation, this system sends necessary instruction to the apparatus or indicates guidance to a worker with respect to manual work using wafer tweezers. This explanation is similarly applied to later-described transfer operation other than the lot (i.e. wafer) unloading operation.

Furthermore, the "A: natural unloading" processing is carried out with reference to next work conditions of respective lots in an objective ship (SHIP). Namely, the next work is determined at the send-out timing based on the latest manufacturing process (lot) flow or past historical data of the lot constituting its ship (SHIP). When there are a plurality of apparatuses being selectable in the next work, determining (temporarily determining) an apparatus is carried out prior to the work if the system configuration requires temporarily determining any apparatus.

In the case that the system configuration requires the selection among a plurality of apparatuses immediately before executing the in-process work step, this processing is carried out at this moment. In this case, it is preferable to (temporarily) determine the next apparatus in such a manner that the mix-loaded lots are assigned to the same apparatus if possible.

As a result, it is necessary to satisfy all of the following conditions to cause no unloading operation.

1. The conditional codes of the next work can be processed simultaneously in a concerned apparatus.

2. The apparatuses in the next work are the same.

3. The ship (SHIP) does not include any unsteady lot that needs to be temporarily retained or cannot be brought into the in-process work step.

When the above-described conditions 1, 2, and 3 are not satisfied at the same time, the unloading operation must be done. The system classifies the unloading reasons in detail and explicitly explains why the worker must wait for the transfer operation.

In the case that the next apparatus has no capability of accepting different type work step conditions, the above-described condition 1 is that the next work conditional codes are the same. In the case that the next apparatus has the capability of accepting different type work step conditions, that is a recipe group (or work step conditions group) having the next work conditional codes accepting different type work step conditions. This recipe group is determined beforehand.

Furthermore, when the next apparatus uses a probe card or a reticle or another jig, or when the next apparatus uses gaseous material for the ion implantation, the question whether or not the preparatory conditional codes for setting these conditions should be added as one of parameters used in the above determining logic.

Other various mix-loading restricting conditions causing the unloading operation will be described later.

Next, "B: mix-loading operation for improving apparatus in-process efficiency" of this system will be explained. This function relates to FIGS. 5 and 7, especially relates to FIG. 5, in which the processing time is long and the apparatus has the capability of simultaneously processing numerous wafers. To increase the processing efficiency in such an apparatus, the system gives mix-loading instructions to automated facilities or to workers according to this function.

In ordinary cases, this is carried out in plural carrier batch processing apparatuses. However, it is possible to carry out it in a single carrier batch apparatus.

The system has the following three type variable settings to be determined beforehand according to the capability of the apparatus.

<1> Ordinary Mix-Loading Operation for Improving Apparatus In-Process Efficiency This mix-loading pattern is characterized by simply adding another lot group of mix-loaded lots before the carrier is conveyed to a facility having sufficient capability of increasing the wafer loading number (or rate). The additional lot mix-loading of new wafers onto the carrier can increase the apparatus in-process efficiency. Namely, before executing the processing at the apparatus that can accept the increased wafer loading number (or rate), additional lot loading of new wafers is carried out to increase the total number of wafers to be loaded on the carrier carrying a plurality of lot-loaded wafers.

<2> Unloading-Included Mix-Loading Operation for Improving Apparatus In-Process Efficiency This mix-loading pattern is characterized by once unloading all or part of mix-loaded lots and then additionally loading required lots onto the carrier before the carrier is conveyed to a facility having sufficient capability of increasing the wafer loading number (or rate). This lot mix-loading of wafers onto the carrier can increase the apparatus in-process efficiency. Namely, before executing the processing at the apparatus that can accept the increased wafer loading number, all or part of lot-loaded wafers are once unloaded from the carrier carrying a plurality of lot-loaded wafers and then additional lot loading of new wafers is carried out to increase the total number of wafers to be loaded on the carrier.

<3> Lot Division-Included Mix-Loading Operation for Improving Apparatus In-Process Efficiency This mix-loading pattern is characterized by once dividing the manufacturing lot A into a plurality of manufacturing lots assigned by additional lot numbers A-1, A-2, - - - and then executing the mix-loading of necessary lots before the carrier is conveyed to a facility having sufficient capability of increasing the wafer loading number (or rate) and when it is preferable to increase the wafer loading number (or rate) to eliminate straddle carrying of the manufacturing lots. Namely, before executing the processing at the apparatus, at least part of wafers contained in the same lot is once unloaded from the carrier carrying a plurality of lot-loaded wafers so that the original lot number of each unloaded wafer can be identified later. And then, additional lot loading of new wafers is carried out to increase the total number of wafers loaded on the carrier. Namely, the apparatus in-process efficiency can be increased. In this manner, the lot division is referred to as a process of dividing a certain lot A into a plurality of lots.

This method is preferably applicable in the way of manufacturing processes. For example, the wafers need to be sorted according to the quality level or rank (this is hereinafter referred to as classification). If the carriers are sorted according to the quality level or rank, the wafer loading number (or rate) will decrease. In such a case, it is desirable to classify the wafers according to the quality level or rank and load the classified wafers on the carrier while leaving the manufacturing lots unchanged.

These things are regulated in the code describing the work step conditions of the apparatus. The processing timing of the "B: mix-loading operation for improving apparatus in-process efficiency" is set to the time the lot in-process work step is determined. Accordingly, this processing is carried out together with the batch assembling processing (i.e. the processing for determining a combination of carriers to be processed or machined together in executing the batch processing) or together with the reservation processing for determining these in-process work steps beforehand. Actually, the transfer operation is carried out at the time the system determines an objective to be subjected to an in-process work step.

The processing method of the "B: mix-loading operation for improving apparatus in-process efficiency" includes a step of searching a ship (SHIP) being mix-loadable with a ship (lot) having the highest in-process priority or being batch assembled. If mix-loadable, it is mix-loaded. If not mix-loadable, it is batch assembled.

When the level of the ships being thus obtained as mix-loading or batch group has reached a sufficient workpiece number, or when the non-operated time of the apparatus has reached a constant time, the grouping is finalized.

When the mix-loading or unloading transfer operation is carried out immediately before executing the in-process work step, the transfer time will be long if the apparatus has a relatively short processing time. The efficiency will decrease. Accordingly, it is carried out when the in-process work step is determined in the reservation processing. Furthermore, the previously-described sufficient workpiece number and the non-operated time are optimized based on actual result (past historical data) etc. In this manner, according to the above-described "ordinary mix-loading operation for improving apparatus in-process efficiency", "unloading-included mix-loading operation for improving apparatus in-process efficiency", or "lot division-included mix-loading operation for improving apparatus in-process efficiency", the mix-loading efficiency can be further increased by executing the unloading or division appropriately.

It is preferable to execute this processing at the in-process timing considering the in-process priority of each ship (lot).

Next, "C: mix-loading operation applied to sheet-feed recipe machine" will be explained. The sheet-feed recipe machine shown in FIG. 7 has the capability of setting the recipe for each wafer. Accordingly, this machine can accept the mix-loading of wafers having different recipes when the wafers are brought into the in-process work step. However, in this case, it may be difficult to execute the mix-loading of all wafers having different recipes and accordingly the mix-loading may be limited to the wafers belonging to the same recipe group.

The "C: mix-loading operation applied to sheet-feed recipe machine" enables to execute the mix-loading when the wafers are brought into in-process work step in the sheet-feed recipe machine so as to increase the wafer number (rate) in each ship (SHIP). This chiefly increases the transportation efficiency or shortens the setup time. The "C: mix-loading operation applied to sheet-feed recipe machine" includes the above-described three type variable settings <1>, <2>, and <3> explained in the "B: mix-loading operation for improving apparatus in-process efficiency."

Like the "B: mix-loading operation for improving apparatus in-process efficiency", the processing timing of the "C: mix-loading operation applied to sheet-feed recipe machine" is set to the time the lot in-process work step is determined. Accordingly, the transfer operation is carried out at the time the system determines an objective to be subjected to the in-process work step.

The processing method of the "C: mix-loading operation applied to sheet-feed recipe machine" includes a step of searching a ship (SHIP) being mix-loadable with a ship (lot) having the highest in-process priority. If mix-loadable, it is mix-loaded. When the level of the ships being thus obtained as mix-loading group has reached a sufficient workpiece number, or when the non-operated time of the apparatus has reached a constant time, the grouping is finalized.

In the case that all of the wafers having different recipes are not mix-loadable simultaneously, or when the mix-loading is limited to the wafers belonging to the same recipe group, differently defined mix-loadable recipe groups are newly defined as objectives.

Next, "D: mix-loading operation at mix-loading waiting point" will be explained. It is preferable to define a mix-loading waiting point provided at a specific point of the manufacturing process flow in the following cases.

Even in the case that optional produces or the lots having similar manufacturing process flows are mix-loaded, they may be subjected to the natural unloading depending on the work step conditions or the like. Meanwhile, the "mix-loading operation for improving apparatus in-process efficiency" includes unloading/division operations. In this manner, there is the tendency that the number of ships (=carriers) increases. In such cases, the mix-loading waiting point is defined.

Providing the mix-loading waiting point at an appropriate point on the manufacturing process flow enables particular lots to wait for a while to find out partner lots to be mix-loaded together, and accordingly they are mix-loaded together at this mix-loading waiting point. This operation aims to increase the processing efficiency in the succeeding processes and also suppress the total number of carriers used in the factory. Namely, the mix-loading waiting point is a place where the carrier receives an instruction with respect to the required mix-loading prior to the in-process work step executed in the apparatus. Thus, the carrier may not completely stop at this mix-loading waiting point. Thus, according to this function, the carrier is once stopped or decelerated at the mix-loading waiting point before it proceeds to the apparatus to make a judgment as to whether or not additional lots should be loaded on the carrier.

More specifically, the mix-loading waiting point defines beforehand the following work step standards or the like (i.e. definition codes of mix-loading waiting point).

1. product name and fundamental process (mask designative)
2. process block code (mask designative)
3. work step work conditional code (mask designative)

This mix-loading processing is carried out at the send-out timing of the previous work step positioned at the upstream side of the mix-loading waiting point.

In this case, the objective lot is not in-processible in the next work step and is accordingly in the mix-loading waiting condition. The next work step of the lot in the mix-loading waiting condition has been already determined. The apparatus positioned next at the send-out timing is provisionally the next apparatus (although it may be changed in the following processing). Furthermore, in a case that special processing (e.g., leaving it temporarily before proceeding the next work step or executing interrupt processing designated by the work step) is required at the send-out timing, the lot is brought into the mix-loading waiting condition after this conditional processing is accomplished.

The processing method of the "D: mix-loading operation at mix-loading waiting point" requires the following minimum necessary conditions to be satisfied to carry out the mix-loading operation.

1. The conditional codes of the next work can be processed simultaneously in a concerned apparatus.

2. The common alternative apparatuses (a plurality of identical machines) are available, or the same work can be done by a plurality of apparatuses.

The above-described conditions may be insufficient when required to avoid any unloading in the succeeding work steps of the mix-loading waiting point. In such a case, it is preferable to add conditions relating to the priority in the mix-loading operation at the mix-loading waiting point.

The following is one example of the additional conditions.

1. Waiting of T1 minutes or fulfillment of N1 pieces with respect to the same product name and the same work step.

2. Waiting of T2 minutes or fulfillment of N2 pieces with respect to the same product name group and the same work step.

3. Waiting of T3 minutes or fulfillment of N3 pieces with respect to the same fundamental process and the same work step.

4. Waiting of T4 minutes or fulfillment of N4 pieces with respect to the same fundamental process group and the same work step.

5. Waiting of T5 minutes or fulfillment of N5 pieces with respect to the same work step.

The product name group is a code representing an assembly of a plurality of product names consisting of a group of optional products or the like. Furthermore, the fundamental process group is a code representing an assembly of similar fundamental processes.

These definitions are defined by using the definition codes for the mix-loading waiting point.

More specifically, it is possible to register a plurality of following sets.

1. priority number (series number starting from 1 and designating the order of conditional check)

2. the same condition number (1: the same product name and process, 2: the same product name group and process, - - - )

3. sufficient workpiece number (N pieces)

4. waiting time (T minutes)

The following combination is also definable.

1'. Waiting of 30 minutes or fulfillment of 20 pieces with respect to the same product name and the same work step.

2'. Waiting of 60 minutes or fulfillment of 20 pieces with respect to the same product name group and the same work step.

3'. Waiting of 120 minutes or fulfillment of 10 pieces with respect to the same product name and the same work step.

4'. Waiting of 360 minutes or fulfillment of 10 pieces with respect to the same fundamental process group and the same work step.

The processing is carried out according to the following procedure:

1. arrange all of the mix-loading waiting lots (not the ship) according the priority order reflecting the time each lot is brought into the mix-loading waiting condition;

2. finalize the mix-loading group by executing the following processing for all of lots being arranged according to the above priority order;

3. executing the check in order of the priority number (i=1 to m);

4. define the same conditions for the priority number i with condition i, sufficient workpiece number Ni, and waiting time Ti;

5. finalize the mix-loading group when the lot itself satisfies the sufficient workpiece number Ni for the priority number i;

6. search a mix-loading partner (lot) fulfilling the same condition i and minimum necessary conditions if the waiting time Ti has not yet passed since this lot is brought into the mix-loading waiting condition, and finalize the mix-loading group when the sufficient workpiece number Ni is satisfied;

7. finalize the mix-loading group when the lot itself satisfies the waiting time Tm for priority number m since this lot is brought into the mix-loading waiting condition, although the timer is up according to the lot having the earliest time-up waiting time among all lots loaded on the carrier; and 8. executing the mix-loading of the finalized lot group A. In this case, a lot group B is unloaded and continues to wait the mix-loading if the lot group B does not belong to the group A although it may exist together with the lots of the group A in the same ship.

The above-described procedure is repeated until the sufficient workpiece number is satisfied or the waiting time has passed. Then, the next apparatus determination is carried out based on the thus finalized group so that the same next apparatus is determined.

It is desirable that a system terminal can cancel the mix-loading waiting condition if necessary.

Next, "E: mix-loading restricting conditions" will be explained.

It will be possible to provide various restricting conditions for carrying out the mix-loading operation. Hereinafter, the method for controlling such restricting conditions will be explained.

E-1. Mix-Loading Restricting Conditions Depending on Apparatus (i.e. Conditions Depending on Each Apparatus to Add Restrictions Against Plural Lot Loading of the Wafers onto the Carrier)

There is an apparatus that cannot accept the mix-loading of the wafers. In this case, only the 1 ship=1 lot processing is feasible. Furthermore, the sheet-feed recipe machine may restrict or regulate the maximum preparatory step number. For example, an apparatus using the reticle may restrict the maximum number with respect to the usable reticle product names or the maximum number (including 1) with respect to the preparatory step jigs. The natural unloading is carried out so as to satisfy such regulations or restrictions. The same thing is applied to the mix-loading processing using a sheet-feed recipe machine or the mix-loading processing at the mix-loading point.

E-2. Mix-Loading Restricting Conditions Depending on Product Name etc. (i.e. Conditions Depending on at Least Either One of Product Name and Fundamental Process Flow to Add Restrictions against Plural Lot Loading of the Wafers onto the Carrier)

There is an assembly of product names that cannot accept the mix-loading of the wafers. In this case, the following definition is necessary.

1. mask-designating the combination of a product name and a fundamental process that are not mix-loadable (a plurality of combinations can be designated).

2. mask-designating the combination of a product name and a fundamental process that can accept the mix-loading (a plurality of combinations can be designated).

In carrying out various mix-loading operations, the above conditions should be satisfied.

E-3. Mix-Loading Restricting Conditions Depending on Carrier (i.e. Conditions Depending on Carrier Type to Add Restrictions against Plural Lot Loading of the Wafers onto the Carrier)

Carriers used in a factory may be made of different materials or classified into a plurality of ID groups or color types. The mix-loaded lots must be restricted to the same carrier type in the case that a work step or an apparatus accepts the processing according to the carrier type or when regulated depending on the upstream/downstream position of the manufacturing process flow.

In carrying out various mix-loading operations, the above conditions should be satisfied.

E-4. Mix-Loading Restricting Conditions Depending on Lot

Lot Tying and (Lot) Loading Condition Retention

The lot tying is a function for managing the lot group of once mix-loaded lots so as not to be separated easily. In other words, the word "tie" is used based on such an impression that a lot group consists of a plurality of lots being banded together with a strap or a band.

On the other hand, the loading condition retention is a function for prohibiting the change of the mix-loading (including a single lot loading) condition. This function prohibits any new mix-loading of lots onto the carrier or any unloading/division processing.

E-4.1. Tying of Lots

In some cases, for experimental purposes or other reasons, it may be preferable to manage a plurality of lots in the same carrier as if these lots are collectively a non-separable single lot, when these lots are almost the same in the work step flow. The screen instructing the work uses a layout giving an impression as if they are seen as a single lot. When the manipulation is necessary for each lot, the manipulation is feasible for each lot by handling it as another lot. This prevents the system from becoming complicated.

If necessary, each user can enter instructions through a system terminal to select arbitrary lots to be tied in the same carrier (a plurality of tying designations is allowed in the same carrier).

The plurality of once tied lots cannot be designated as unloading/division objective even in the case that the unloading/division included mix-loading operation for improving apparatus in-process efficiency is carried out.

Furthermore, even when the mix-loading is carried out at the mix-loading waiting point, the plurality of once tied lots is mix-loaded as a set. However, the unloading/division processing must be done when the unloading/division processing is required from the restriction relating to the maximum processing workpiece number of the apparatus (although the re-tying operation is required independently). Furthermore, when the work step conditions or final determination of the apparatus do not allow the plurality of once tied lots to be processed simultaneously, the natural unloading operation is carried out (and the re-tying operation is performed independently). Cancellation of such conditions is notified to the user with an alarm. Alternatively, it is possible to immediately interrupt the work.

The tying operation can be also used in the following case (i.e. in the case of partner waiting mix-loading).

When at least part of the wafers in a lot needs to be subjected to reworking, the lot will be separated temporarily into two lots: i.e., a lot of wafers having already finished the reworking and a lot of wafers being currently subjected to the reworking. After finishing the reworking operation for all of the wafers, two lots are mix-loaded again into the tied condition. Thus, these temporarily separated lots can be regarded as a single lot in succeeding manufacturing processes unless the natural unloading is carried out.

E-4.2. Retention of Lot Loading Condition

The retention of lot loading condition is retaining the lot loaded conditions in the carrier while prohibiting the unloading or newly added mix-loading processing. For example, when the n lots/carrier (n is an integer not smaller than 1 and a fixed value) condition is set, the condition of n lots/carrier is continuously retained. Existence of any tying lot in the carrier is allowable. If necessary, the user can designate a carrier (i.e. ship) to be retained in the same lot loading condition through a system terminal. Designating the retention of lot loading condition can be simultaneously done together with designation of the prohibition of lot division.

The ship retaining the lot loading condition should not be designated as unloading/division objective even when the unloading/division included mix-loading operation for improving apparatus in-process efficiency is carried out. For example, this ship should not be designated as objective for the mix-loading operation at the mix-loading waiting point. This ship is used in the manufacturing process requiring no new mix-loading operation. However, the unloading/division processing must be done (in other words, the retention of lot loading condition is cancelled) when the unloading/division processing is required from the restriction relating to the maximum processing workpiece number of the apparatus. Furthermore, when the minimum processing workpiece number of the apparatus is related, the mix-loading operation is continued until the required workpiece number is fulfilled (i.e. the retention of lot loading condition is cancelled). Furthermore, when the determined work step conditions of the apparatus do not accept the mix-loading operation, the natural unloading operation is carried out (i.e. the retention of lot loading condition is cancelled).

Cancellation of such conditions is notified to the user with an alarm. Alternatively, it is possible to immediately interrupt the work.

As described above, the retention of lot loading condition is characterized at least by prohibiting the loading of wafers in any new lot onto the carrier.

E-5. Prohibition of Lot Division

The lot division should be prohibited in the case that the lot is not preferable as an objective to be divided. However, when the lot division is required from the restriction relating to the maximum processing workpiece number of the apparatus, the lot division processing is carried out while cancellation of such conditions is notified to the user with an alarm. Alternatively, it is possible to immediately interrupt the work. As described above, the lot condition is maintained when the lot division is prohibited beforehand.

E-6. Super Express Lot

Manufacturing for a super express lot should be accomplished as soon as possible without being interrupted by the mix-loading or unloading operations in the way of its manufacturing processes. The following processing is preferably used for manufacturing the super express lot.

At the time a certain lot is designated as super express lot, the retention of lot loading condition is automatically set. It is however possible to cancel the retention of lot loading condition when a manual instruction is entered to remove the restriction of mix-loading operation. In this manner, loading additional wafers contained in other lot to the carrier of the super express lot is basically prohibited.

Next, "F: stepwise efficient investment (supply) method" for an existing system will be explained. For example, the carrier managing system based on one(carrier)-to-one(lot) relationship is employed in the existing system. This method is preferably applied to improve such an existing or old system without requiring a large scale of replacement of the system, while effectively utilizing the existing properties (including continuous manufacturing activities in the existing factories).

The old system, as shown in FIG. 15, adopts a one-to-one carrier managing method with respect to the basic relationship between the carrier and the manufacturing lot. This old system can be renovated through several steps into a new system introducing the lot mix-loading type operations and related system management. Namely, the new system in this case is characterized by the capability of loading the wafers contained in a plurality of lots onto the carrier, while the old system retains the one-to-one relationship for managing the carrier and the manufacturing lot. To realize this, the new system allows the existence of a one-to-one relationship between a pseudo carrier and its manufacturing lot (for a plurality of combinations) in addition to the one-to-one relationship between the genuine carrier and its manufacturing lot. This introduces a dummy one-to-one management that enables the new lot mix-loading type system to realize mix-loading operation of a plurality of lots onto the carrier.

More specifically, as shown in FIG. 15, the old system is given imaginary carrier IDs #0001, #0002, and #0003 usable only for designating virtual carriers existing in this system. When the lot mix-loading operation is carried out, the old system is allowed to continuously manage the carrier and the manufacturing lot based on the one-to-one relationship while the new system (i.e. the lot mix-loading type system) manages the carrier and the manufacturing lot based on the 1-to-n relationship. Namely, only one representative lot (i.e. MZ12301-0156 shown in FIG. 15) is left on the actual carrier S0123 while other lots (MZ12301-0154, MZ12303-0159, and MZ12309-0140) are regarded as being loaded on virtual carriers (#0001, #0002, and #0003). In this case, the old system and the new system mutually hold the link information relating to IDs of the virtual carriers and the genuine carrier. According to this method, the lot mix-loading system can be realized without changing the one-to-one carrier managing method of the old system.

In short, the old system can manage the representative lot in relation to the genuine carrier and remaining lots in relation to virtual carriers only effective in the system. For example, in the manufacturing operations or controls in a factory, the in-process send-out data management is carried out based on the representative lot. The temporary interrupt, wafer sampling, or any other special processing is carried out under the condition that the mix-loading is canceled in the new system. On the other hand, the production management and the historical data management can be done for each lot while disregarding the carrier. In this case, the new system performs the lot mix-loading management and has the transfer manipulation function (mix-loading and mix-loading canceling function), although stepwise preparations will be required for realizing the temporary interrupt, the wafer sampling, or any other special processing.

In this manner, in a case that the old system using a one-to-one relationship for managing the carrier and the manufacturing lot coexists with the new system using a 1-to-n (n is an integer not smaller than 1) relationship for managing the carrier and the manufacturing lot, it is preferable that the manufacturing managing method includes a step of assigning an original carrier number and an original lot number to one carrier and its lot in the old system and also assigning a pseudo carrier number and a pseudo lot number to other carrier and its lot, thereby realizing a dummy one-to-one management applied to the carrier and the manufacturing lot.

Further to various examples of the lot mix-loading type system explained in the above description, actual mix-loading effects will be explained hereinafter based on a practical example of the semiconductor wafer factory. The lot mix-loading patterns described with reference to FIGS. 12, 13, and 14 relate to a representative manufacturing method for the multi-kind and small quantity production. Namely, these lot mix-loading patterns show the mix-loading method applicable in the manufacturing processes for processing different types of similar workpieces in the way of process flow by changing partly the patterning or circuit forming conditions in the photolithographic process. More specifically, as shown in FIG. 12, a mix-loading of wafers partly differentiated in using different reticle process flows (i.e. the mix-loading based on the same work step conditions) can be carried out. As shown in FIG. 13, a mix-loading of wafers processed in similar process flows using different reticles (i.e. the mix-loading based on the same work step conditions combined with the mix-loading based on different work step conditions) can be also carried out. Furthermore, as shown in FIG. 14, a mix-loading of wafers processed in manufacturing process flows having partly differentiated work steps (i.e. the mix-loading based on the same work step conditions combined with the mix-loading based on different type work step conditions) can be carried out.

Figure 12:
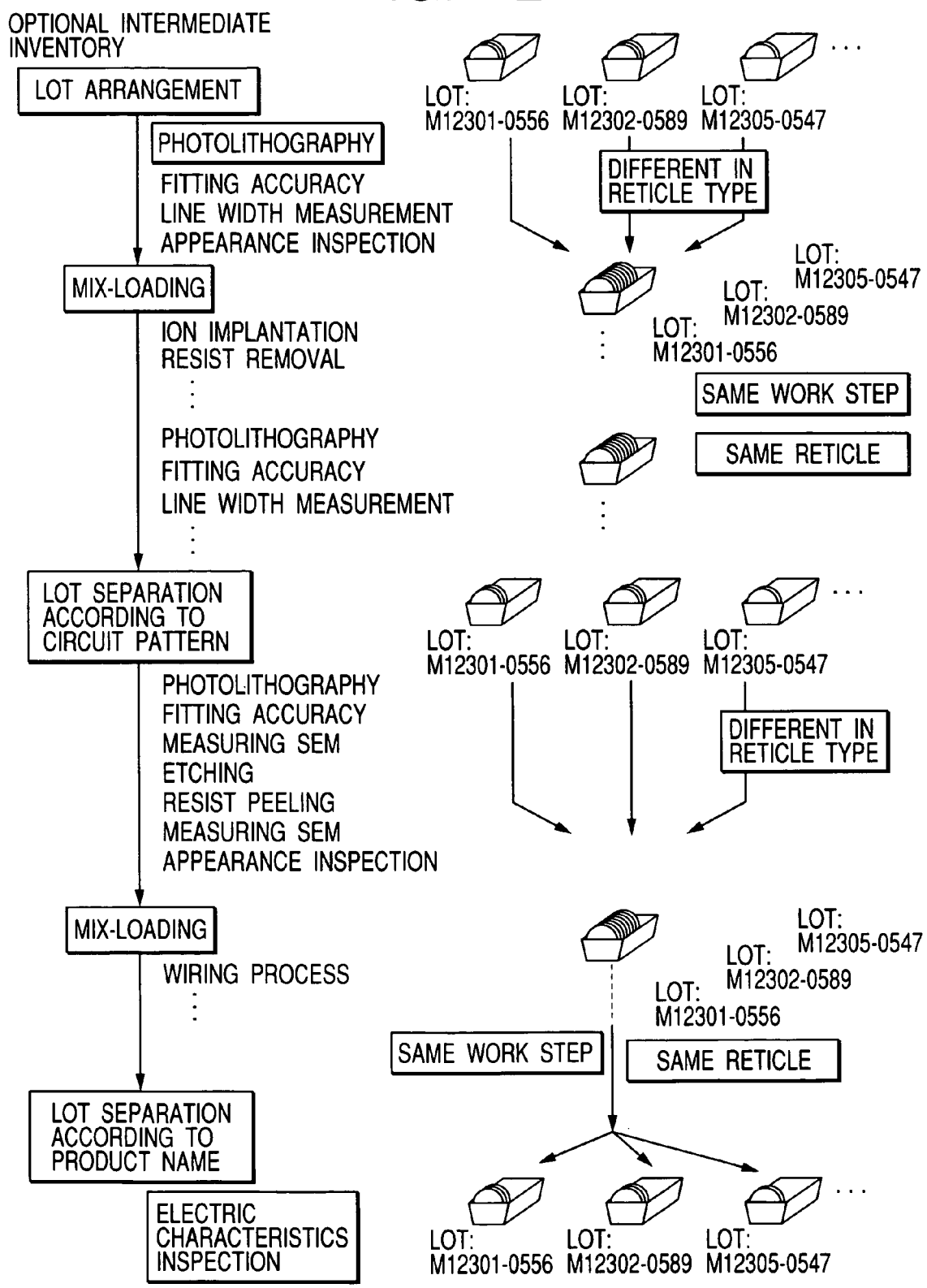
FIG. 12 is a diagram explaining the mix-loading of lots during manufacturing processes in accordance with a preferred embodiment of the present invention.
Figure 13:
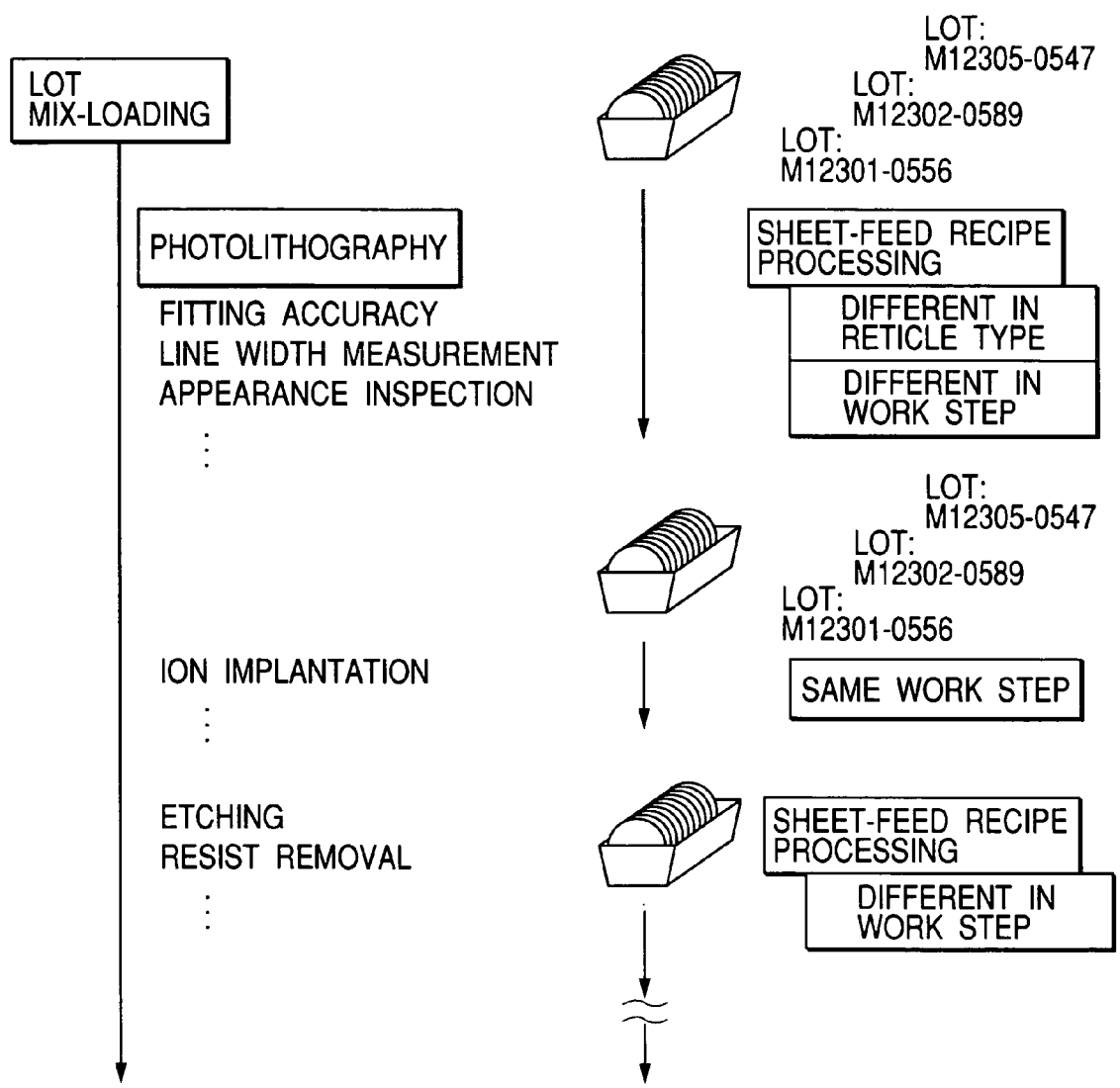
FIG. 13 is a diagram explaining the mix-loading of lots during manufacturing processes in accordance with a preferred embodiment of the present invention.
Figure 17:
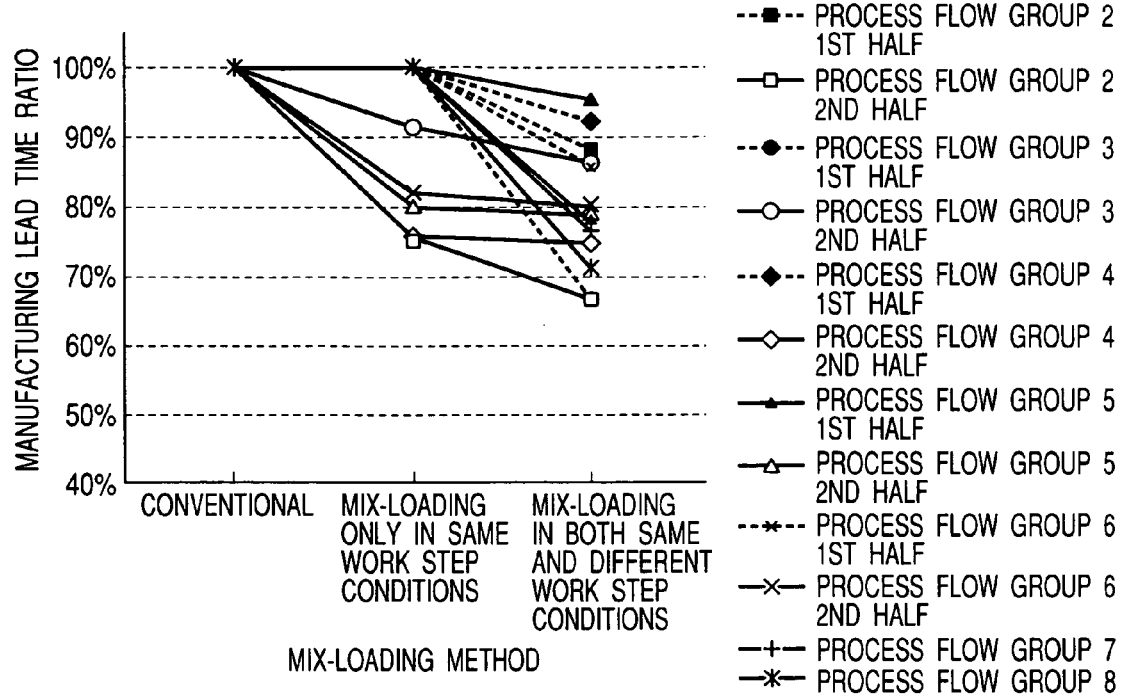
FIG. 17 is a graph showing the result of the simulation performed to confirm the effects of the manufacturing method in accordance with the preferred embodiment of the present invention.
Figure 18:
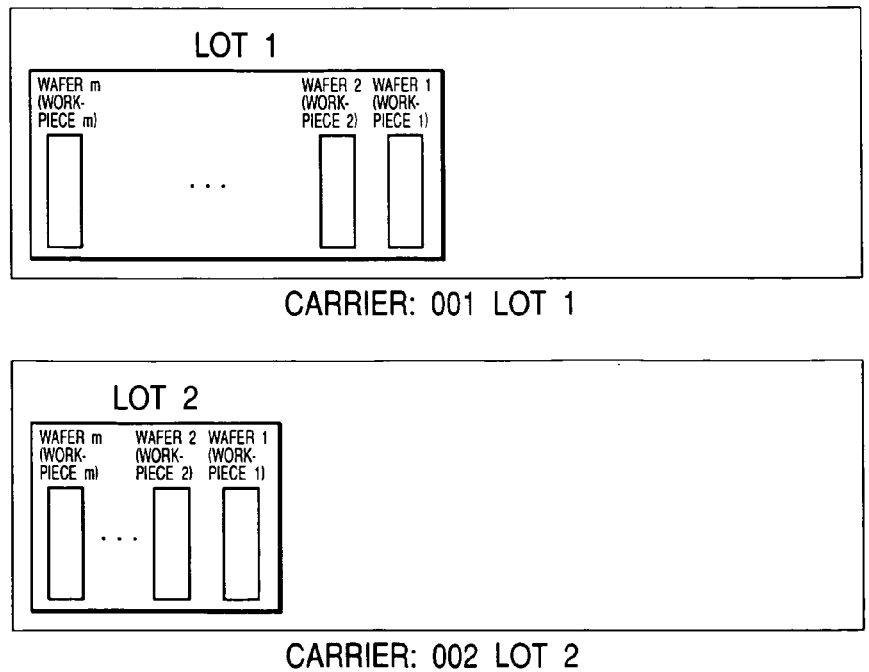
FIG. 18 is a diagram showing a wafer loading condition of a carrier in accordance with a conventional manufacturing method.

FIGS. 16 and 17 show the result of simulation (conducted as a trial for system development) with respect to the lot mix-loading operation carried out in the manufacturing process shown in FIGS. 12 and 13. FIG. 16 shows the loading rate of the carrier, and FIG. 17 shows the comparison with respect to the manufacturing lead time. The manufacturing lead time ratio (%) in FIG. 17 represents a reduced manufacturing lead time when the manufacturing lead time of a conventional, namely using no lot mix-loading, manufacturing method is 100%. In this simulation, the maximum wafer number loadable on the carrier is 25 pieces.

As shown in FIG. 16, this simulation assumes a manufacturing factory in which an optional process coexists with other process for large quantity production. This assumption is adopted to evaluate the effects of the lot mix-loading under severe circumstances. The optional process is, for example, a type including first and second halves or may be an optional process flow serving as a second half of the similar process flow group.

As apparent from FIGS. 16 and 17, the lot mix-loading method of the present invention as well as its control and managing system bring significant effects in increasing the loading rate of each carrier and in reducing the manufacturing lead time.

Figure 14:
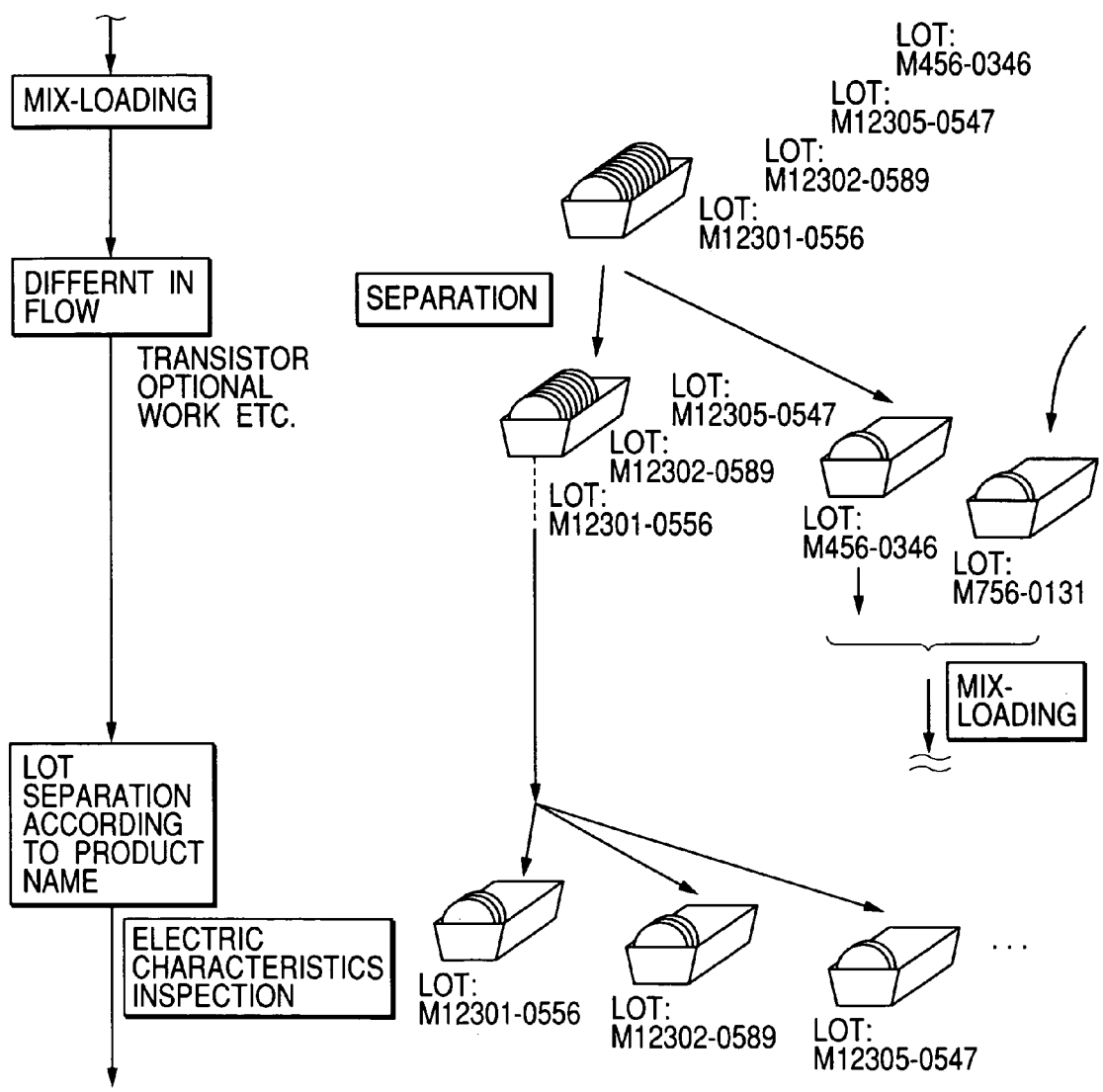
FIG. 14 is a diagram explaining the mix-loading of lots during manufacturing processes in accordance with a preferred embodiment of the present invention.

It is needless to say that, adding the operation shown in FIG. 14 brings further preferable effects.

As described above, this system includes a step of loading additional wafers contained in another lot onto the carrier without causing any contradiction to the lot management adopted in a conventional manufacturing managing method, and can be preferably applied to an automated factory. In the case of manufacturing semiconductor wafers or other devices regularly or by way of experimental trial, the manufacturing managing method of this system designates each manufacturing lot containing at least one wafer as a main objective to be managed, as a basic pattern. This system allows the loading operation of a plurality of manufacturing lots onto the same carrier (i.e. lot mix-loading operation). According to this loading method, the wafer loading number (or rate) in each lot is reduced while the wafer loading number (or rate) in the carrier can be increased.

In manufacturing a small quantity of the required products at the required timing, using the lot mix-loading operation enables to maintain or increase the wafer loading number (or rate) in each carrier. Thus, in each manufacturing (or, measuring or inspecting) apparatus it becomes possible to improve the in-process efficiency and reduce the inventory in respective manufacturing processes. The lead time can be shortened.

Furthermore, the present invention is not limited to the manufacturing (including the trial manufacturing) of semiconductor devices (e.g. wafers). More specifically, the present invention can be applied to any other manufacturing processes for various liquid crystal or plasma display devices, or magnetic or optical disks or any other recording media, or thin-film heads, or superlattice memories, and any other organic material containing devices (e.g. organic EL, or organic photosensitive member).

What is claimed is:

1. A manufacturing managing method comprising the steps of:
   designating a plurality of manufacturing lots and a plurality of specific manufacturing lots, each manufacturing lot and each specific manufacturing lot containing one or more workpieces, the one or more workpieces of each manufacturing lot requiring one or more in-process work steps executed at respective predetermined work conditions, the in-process work steps or the predetermined work conditions for each workpiece of each manufacturing lot differing from those for each workpiece of the other manufacturing lots, each workpiece of the specific manufacturing lots requiring a specific in-process work step, a work condition of the specific in-process work step for the one or more workpieces of one specific manufacturing lot differing from those of the specific in-process work step for the one or more workpieces of the other specific manufacturing lots;
   initially loading the one or more workpieces of each manufacturing lot on one or more carriers so as to load the one or more workpieces of only one manufacturing lot on each of the carriers, a maximum number of workpieces allowed to be loaded on each carrier being a predetermined number;
   mix-loading all or a part of the one or more workpieces of the specific manufacturing lots on a specific carrier selected from the carriers just before transporting the one or more workpieces of the specific manufacturing lots to a processing apparatus that is capable of simultaneously bringing a plurality of workpiece into the specific in-process work step of different work conditions, a number of workpieces of the specific manufacturing lots mix-loaded on the specific carrier being the predetermined number or less; and
   transporting said specific carrier to the processing apparatus to process the one or more workpieces of the specific manufacturing lots mix-loaded on the specific carrier in the specific in-process work step of a current manufacturing process flow at different work conditions.

2. The manufacturing managing method in accordance with claim 1, further comprising a step of making a judgment before starting the specific in-process work step in said processing apparatus as to whether or not said one or more workpieces contained in said specific manufacturing lots should be loaded on said specific carrier.

3. The manufacturing managing method in accordance with claim 2, further comprising a step of further mix-loading at least one workpiece of at least one specific manufacturing lot on the specific carrier under a condition that the one or more workpieces contained in the specific manufacturing lots have already been loaded on the specific carrier before said specific carrier is transported to the processing apparatus that has the capability of processing an increased number of workpieces.

4. The manufacturing managing method in accordance with claim 1 further comprising a step of making a judgment after finishing the specific in-process work step in said processing apparatus as to whether or not the one or more workpieces of one specific manufacturing lot should be unloaded from said specific carrier under a condition that the one or more workpieces contained in the specific manufacturing lots are loaded on said specific carrier.

5. The manufacturing managing method in accordance with claim 4, further comprising a step of unloading the one or more workpieces of the specific manufacturing lot from said specific carrier before the specific carrier is transported to a second processing apparatus in a subsequent manufacturing process flow, a second specific in-process work step being executed in the second processing apparatus and not being required for the one or more workpieces of the specific manufacturing lot.

6. The manufacturing managing method in accordance with claim 1, further comprising a step of unloading the one or more workpieces of one specific manufacturing lot from the specific carrier, a second specific in-process work step to be executed in a second processing apparatus in a subsequent manufacturing process flow not being required by the one or more workpieces of the one specific manufacturing lot and being required by the one or more workpieces of an other specific manufacturing lot; and a step of loading at least one workpiece of a second specific manufacturing lot differing from the specific manufacturing lots on said specific carrier, thereby repacking the workpieces on the specific carrier before starting the second specific in-process work step in said second processing apparatus, the second specific in-process work step being required by the workpieces of the second specific manufacturing lot.

7. The manufacturing managing method in accordance with claim 1, further comprising:

after the step of mix-loading, unloading at least one workpiece of one specific manufacturing lot from the specific carrier before starting the specific in-process work step in said processing apparatus in such a manner that an original lot number of each unloaded workpiece can be identified later, and loading at least one workpiece of another specific manufacturing lot on said specific carrier.

8. The manufacturing managing method in accordance with claim 1, wherein the step of mix-loading all or a part of one or more workpieces of the specific manufacturing lots includes:

temporarily stopping or decelerating said specific carrier at a mix-loading waiting point provided adjacent to said processing apparatus; and making a judgment as to whether or not the one or more workpieces of the specific manufacturing lots are loadable on said specific carrier.

9. The manufacturing managing method in accordance with claim 1, wherein said processing apparatus restricts the loading of workpieces contained in a plurality of manufacturing lots onto said specific carrier.

10. The manufacturing managing method in accordance with claim 1, wherein the loading of workpieces contained in a plurality of manufacturing lots onto said specific carrier is restricted based on one of a product name and a fundamental process flow.

11. The manufacturing managing method in accordance with claim 1, wherein the loading of workpieces contained in a plurality of manufacturing lots onto said specific carrier is restricted based on a carrier type.

12. The manufacturing managing method in accordance with claim 7, wherein one of the specific manufacturing lots is continuously loaded on the specific carrier when unloading of said specific manufacturing lot is prohibited beforehand.

13. A manufacturing managing method comprising the steps of:

providing a plurality of manufacturing lots, each manufacturing lot containing one or more workpieces, the one or more workpieces of each manufacturing lot requiring one or more in-process work steps, the in-process work steps required for the one or more workpieces of each manufacturing lot differing from those required for the one or more workpieces of the other manufacturing lots;

designating each of the plurality of manufacturing lots;

providing a plurality of processing apparatuses, each of the processing apparatuses executing a specific in-process work step;

initially loading the one or more workpieces of each manufacturing lot on one or more carriers so as to load the one or more workpieces of only one manufacturing lot on each of the carriers, a maximum number of workpieces allowed to be loaded on each carrier being a predetermined number when the execution of the specific in-process work step in each of the processing apparatuses is intended to execute the specific in-process work steps in the processing apparatuses, selecting a plurality of specific manufacturing lots containing the one or more workpieces, which require the specific in-process work step of the processing apparatus, from the manufacturing lots;

mix-loading the one or more workpieces of the specific manufacturing lots loaded on the carriers on a specific carrier selected from the carriers each time the specific manufacturing lots are selected; and transporting the specific carrier having the one or more workpieces of the specific manufacturing lots requiring the specific in-process work step of the processing apparatuses to the processing apparatus to execute the specific in-process work step for the workpieces of the specific manufacturing lots, all in-process work steps required by the one or more workpieces of each manufacturing lot being executed in the processing apparatuses.

14. The manufacturing managing method in accordance with claim 13, wherein the one or more workpieces of the specific manufacturing lots loaded on said specific carrier are managed as a lot group.

15. The manufacturing managing method in accordance with claim 13, wherein a loading of workpieces onto said specific carrier by using a manufacturing lot different from the specific manufacturing lots is prohibited.

16. The manufacturing managing method in accordance with claim 13, wherein a loading of workpieces contained in other manufacturing lots is prohibited when one of the specific manufacturing lots to be processed is urgently loaded on said specific carrier.

17. The manufacturing managing method in accordance with claim 13, wherein in a case that a first system using a one-to-one relationship for managing a first carrier and one manufacturing lot coexists with a second system using a 1-to-N N is an integer not smaller than 1) relationship for managing a second carrier and N manufacturing lots, said manufacturing method applied to said second system comprises:

selecting a representative manufacturing lot from the N manufacturing lots;

assuming N−1 virtual carriers corresponding to the other N−1 manufacturing lots;

assigning an original carrier number and an original lot number in said first system to the first carrier and the representative lot and assigning pseudo carrier numbers and original lot numbers in said first system to the N−1 virtual carriers and the corresponding N−1 manufacturing lots, respectively, thereby realizing a dummy one-to-one management applied to the carrier and the N manufacturing lots.

18. A manufacturing managing method comprising the steps of:
providing a plurality of manufacturing lots including a plurality of similar manufacturing lots, each manufacturing lot and each similar manufacturing lot containing one or more workpieces, the one or more workpieces of each manufacturing lot requiring one or more in-process work steps executed at respective work conditions, the in-process work steps or the work conditions for each workpiece of each manufacturing lot differing from those for each workpiece of the other manufacturing lots, the one or more workpieces of the similar manufacturing lots requiring at least one of the work steps executed at the same work condition, the one or more workpieces of the similar manufacturing lots requiring a specific in-process work step executed at the same work condition;
designating each manufacturing lot of the plurality of manufacturing lots
initially loading the one or more workpieces of each manufacturing lot on one or more carriers so as to load the one or more workpieces of only one manufacturing lot on each of the carriers, a maximum number of workpieces allowed to be loaded on each carrier being a predetermined number;
mix-loading all or a part of the one or more workpieces of the similar manufacturing lots on a specific carrier selected from the carriers just before transporting the one or more workpieces of the similar manufacturing lots to a processing apparatus that is capable of processing a plurality of workpieces in the specific in-process work step at the same work condition, the number of workpieces of the similar manufacturing lots mix-loaded on the specific carrier being the predetermined number or less; and
transporting said specific carrier to the processing apparatus to process the workpieces of the similar manufacturing lots mix-loaded on the specific carrier in the specific in-process work step of a current manufacturing process flow at the same work condition.

19. The manufacturing managing method in accordance with claim 18, further comprising a step of making a judgment before starting the specific in-process work step in said processing apparatus as to whether or not said one or more workpieces contained in said similar manufacturing lots should be loaded on said specific carrier.

20. The manufacturing managing method in accordance with claim 19, further comprising a step of further mix-loading at least one workpiece of at least one similar manufacturing lot on the specific carrier under a condition that the one or more workpieces contained in the similar manufacturing lots have already be en loaded on the specific carrier before said specific carrier is transported to the processing apparatus that has the capability of processing an increased number of workpieces.

21. The manufacturing managing method in accordance with claim 18, further comprising a step of making a judgment after finishing the specific in-process work step in said processing apparatus as to whether or not the one or more workpieces of a one similar manufacturing lot should be unloaded from said specific carrier under a condition that the one or more workpieces contained in the similar manufacturing lots are loaded on said specific carrier.

22. The manufacturing managing method in accordance with claim 21, further comprising a step of unloading the one or more workpieces of the similar manufacturing lot from said specific carrier before the specific carrier is transported to a second processing apparatus in a subsequent manufacturing process flow, a second specific in-process work step being executed in the second processing apparatus and not being required for the one or more workpieces of the similar manufacturing lot.

23. The manufacturing managing method in accordance with claim 18, further comprising a step of
unloading the one or more workpieces of one similar manufacturing lot from the specific carrier, a second specific in-process work step to be executed in a second processing apparatus in a subsequent manufacturing process flow not being required by the one or more workpieces of the one similar manufacturing lot and being required by the one or more workpieces of an other similar manufacturing lot; and a step of
loading at least one workpiece of a specific manufacturing lot differing from the similar manufacturing lots on said specific carrier, thereby repacking the workpieces on the specific carrier before starting the second specific in-process work step in said second processing apparatus, the second specific in-process work step being required by the one or more workpieces of the specific manufacturing lot.

24. The manufacturing managing method in accordance with claim 18, further comprising:
after the step of mix-loading, unloading at least one workpiece of one similar manufacturing lot from the specific carrier before starting the specific in-process work step in said processing apparatus in such a manner that an original lot number of each unloaded workpiece can be identified later, and
loading at least one workpiece another similar manufacturing lot on said specific carrier.

25. The manufacturing managing method in accordance with claim 24, wherein one of the similar manufacturing lots is continuously loaded on the specific carrier when unloading of said similar manufacturing lot is prohibited beforehand.

26. The manufacturing managing method in accordance with claim 18, wherein the step of mix-loading all or a part of workpieces of the similar manufacturing lots includes:
temporarily stopping or decelerating said specific carrier at a mix-loading waiting point provided adjacent to said processing apparatus; and
making a judgment as to whether or not the one or more workpieces of the similar manufacturing lots are loadable on said specific carrier.

27. The manufacturing managing method in accordance with claim 18, wherein said processing apparatus restricts the loading of the at least one workpiece contained in one of the similar manufacturing lots onto said specific carrier.

28. The manufacturing managing method in accordance with claim 18, wherein the loading of the at least one workpiece contained in one of the similar manufacturing lots onto said specific carrier is restricted based on one of a product name and a fundamental process flow.

29. The manufacturing managing method in accordance with claim 18, wherein the loading of the at least one workpiece contained in one of the similar manufacturing lots onto said specific carrier is restricted based on a carrier type.

* * * * *